United States Patent
Kim et al.

(10) Patent No.: US 11,259,244 B2
(45) Date of Patent: Feb. 22, 2022

(54) METHOD FOR TRANSMITTING OR RECEIVING FRAME IN WIRELESS LAN AND DEVICE THEREFOR

(71) Applicant: LG Electronics Inc., Seoul (KR)

(72) Inventors: Jeongki Kim, Seoul (KR); Suhwook Kim, Seoul (KR); Kiseon Ryu, Seoul (KR); Taewon Song, Seoul (KR); Jinsoo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 16/635,968

(22) PCT Filed: Aug. 17, 2018

(86) PCT No.: PCT/KR2018/009445
§ 371 (c)(1),
(2) Date: Jan. 31, 2020

(87) PCT Pub. No.: WO2019/035682
PCT Pub. Date: Feb. 21, 2019

(65) Prior Publication Data
US 2020/0245238 A1 Jul. 30, 2020

Related U.S. Application Data

(60) Provisional application No. 62/546,561, filed on Aug. 17, 2017, provisional application No. 62/547,896, (Continued)

(51) Int. Cl.
*H04W 52/02* (2009.01)
*H04W 76/11* (2018.01)
(Continued)

(52) U.S. Cl.
CPC ....... *H04W 52/0206* (2013.01); *H04L 1/1614* (2013.01); *H04W 76/11* (2018.02); *H04W 84/12* (2013.01)

(58) Field of Classification Search
None
See application file for complete search history.

(56) References Cited

U.S. PATENT DOCUMENTS

2012/0275364 A1 11/2012 Anderson et al.
2013/0301625 A1* 11/2013 Thoukydides ........ H04W 28/06
370/338
(Continued)

FOREIGN PATENT DOCUMENTS

WO WO2009/078575 6/2009

OTHER PUBLICATIONS

Extended European Search Report in European Appln. No. 18846823.5, dated Jun. 17, 2020, 9 pages.
(Continued)

*Primary Examiner* — Alex Skripnikov
(74) *Attorney, Agent, or Firm* — Fish & Richardson P.C.

(57) ABSTRACT

A method by which an access point (AP) transmits a frame in a wireless LAN, according to one embodiment of the present disclosure, comprises: determining a wake-up radio (WUR) identifier (WID) for identifying a station (STA) and a group identifier (GID) for identifying an STA group to which the STA belongs, in a WUR mode; transmitting the WID and the GID through a primary connectivity radio (PCR) so as to allocate, to the STA, the determined WID and GID; and transmitting, based on the GID or the WID, a WUR frame for waking up a plurality of STAs including the STA operating in the WUR mode, wherein the AP can determine the GID by using a part of an ID space which can be used in the WUR, and determine the WID by using the
(Continued)

remaining space excluding the partial ID space used for the GID.

14 Claims, 29 Drawing Sheets

Related U.S. Application Data filed on Aug. 21, 2017, provisional application No. 62/581,013, filed on Nov. 2, 2017, provisional application No. 62/582,812, filed on Nov. 7, 2017, provisional application No. 62/595,103, filed on Dec. 6, 2017.

(51) Int. Cl.
*H04L 1/16* (2006.01)
*H04W 84/12* (2009.01)

(56) References Cited

U.S. PATENT DOCUMENTS

| | | |
|---|---|---|
| 2014/0321349 A1 | 10/2014 | Seok et al. |
| 2015/0029977 A1 | 1/2015 | Seok |
| 2017/0111858 A1 | 4/2017 | Azizi et al. |
| 2018/0359704 A1* | 12/2018 | Li .................... H04W 52/0219 |
| 2019/0373549 A1* | 12/2019 | Amin ................ H04W 52/0235 |

OTHER PUBLICATIONS

LG Electronics, "WUR MAC issues follow-up," IEEE 802.11-17/0381r0, Mar. 11, 2017, 16 pages.

Qualcomm, "Considerations on WUR frame format," IEEE 802.11-17/1004r0, Jul. 4, 2017, 15 pages.

"Draft Standard for Information technology—Telecommunications and information exchange between systems Local and metropolitan area networks—Specific requirements. Part 11: Wireless LAN Medium Access Control (MAC) and Physical Layer (PHY) Specifications," Institute of Electrical and Electronics Engineers, dated 2018, 90 pages.

European Office Action in EP Appln. No. 18 846 823.5, dated Jan. 14, 2021, 6 pages.

Liu et al., "On Waking-Up Multiple WUR Stations", Mediatek, doc.: IEEE 802.11-17/0028r0, Jan. 2017, 6 pages.

* cited by examiner (a)

(b)

(a)

(b)

METHOD FOR TRANSMITTING OR RECEIVING FRAME IN WIRELESS LAN AND DEVICE THEREFOR

CROSS-REFERENCE TO RELATED APPLICATIONS

This application is a National Stage application under 35 U.S.C. § 371 of International Application No. PCT/KR2018/009445, filed on Aug. 17, 2018, which claims the benefit of U.S. Provisional Applications No. 62/546,561 filed on Aug. 17, 2017, No. 62/547,896 filed on Aug. 21, 2017, No. 62/581,013 filed on Nov. 2, 2017, No. 62/582,812 filed on Nov. 7, 2017 and No. 62/595,103 filed on Dec. 6, 2017. The disclosures of the prior applications are incorporated by reference in their entirety.

BACKGROUND

Field

The disclosure relates to a wireless local area network (WLAN) and, more particularly, to a method for transmitting or receiving a frame through wake-up radio (WUR) or primary connectivity radio (PCR) and a device therefor.

Related Art

IEEE (Institute of Electrical and Electronics Engineers) 802.11 is developed as standards for wireless LAN technology. IEEE 802.11a and 11b use unlicensed bands, IEEE 802.11b provides a transmission speed of 11 Mbps and IEEE 802.11a provides a transmission speed of 54 Mbps. IEEE 802.11g provides a transmission speed of 54 Mbps using orthogonal frequency-division multiplexing (OFDM) at 2.4 GHz. IEEE 802.11n provides a transmission speed of 300 Mbps for four spatial streams using multiple input multiple output-OFDM (MIMO-OFDM). IEEE 802.11n supports up to 40 MHz channel bandwidth. In this case, a transmission speed of 600 Mbps is provided.

The aforementioned wireless LAN standards use a maximum bandwidth of 160 MHz, and IEEE 802.11ax standardization developed from IEEE 802.11ac which supports eight spatial streams to support up to 1 Gbit/s is under discussion.

SUMMARY

An aspect of the disclosure is to provide a method for efficiently and accurately transmitting or receiving a WUR frame for waking up a plurality of WUR STAB and a device therefor.

The disclosure is not limited to the foregoing aspect, and other aspects may be inferred from embodiments of the disclosure.

To achieve the foregoing aspect, a method for an access point (AP) to transmit a frame in a wireless local area network (WLAN) according to an embodiment of the disclosure may include: determining a WUR identifier (WID) for identifying a station (STA) in a wake-up radio (WUR) mode and a group identifier (GID) for identifying a STA group to which the STA belongs; transmitting the WID and the GID through a primary connectivity radio (PCR) in order to allocate the WID and the GID to the STA; and transmitting a WUR frame for waking up a plurality of STAs including the STA operating in the WUR mode based on the GID or the WID, wherein the AP may determine the GID using a portion of an ID space available for WUR and determines the WID using a portion other than the portion of the ID space used for the GID.

To achieve the foregoing aspect, an access point (AP) for transmitting a frame according to another embodiment of the disclosure may include: a transceiver; and a processor to determine a WUR identifier (WID) for identifying a station (STA) in a wake-up radio (WUR) mode and a group identifier (GID) for identifying a STA group to which the STA belongs, to control the transceiver to transmit the WID and the GID through a primary connectivity radio (PCR) in order to allocate the WID and the GID to the STA, and to transmit a WUR frame for waking up a plurality of STAs including the STA operating in the WUR mode based on the GID or the WID, wherein the processor may determine the GID using a portion of an ID space available for WUR and determines the WID using a portion other than the portion of the ID space used for the GID.

When the AP intends to transmit the WUR frame based on the GID, the AP may set the GID in an address field of the WUR frame. The AP may determine that the STA has woken up when receiving a response frame from the STA through PCR after transmitting the WUR frame based on the GID.

When the AP intends to transmit the WUR frame based on the WID, the AP may set 0 other than the GID or the WID in an address field of the WUR frame and may set WIDs of the plurality of STAs in a frame body of the WUR frame.

The AP may transmit one or more GIDs including the GID to the STA through a WUR mode response frame or a WUR mode suspend response frame.

When the WUR frame includes the GID, the WUR frame may further include a bitmap indicating a STA to be woken up in the group identified by the GID as a bit value of 1. The AP may determine a bit position corresponding to the STA in the bitmap through a modulo operation between the WID of the STA and the size of the bitmap. When a STA different from the STA is equally allocated the GID and the STA and the different STA have the same bit position in the bitmap, the AP may set different WUR duty cycle on-durations for the STA and the different STA.

To achieve the foregoing aspect, a method for a station (STA) to receive a frame in a wireless local area network (WLAN) according to still another embodiment of the disclosure may include: receiving a WUR identifier (WID) for identifying the STA in a wake-up radio (WUR) mode and a group identifier (GID) for identifying a STA group to which the STA belongs through a primary connectivity radio (PCR); receiving a WUR frame for waking up a plurality of STAs by entering the WUR mode; and determining whether to wake up based on whether the WUR frame includes the GID or the WID, wherein the GID may be allocated using a portion of an ID space available for WUR, and the WID may be allocated using a portion other than the portion of the ID space used for the GID.

To achieve the foregoing aspect, a station (STA) for receiving a frame according to yet another embodiment of the disclosure may include: a primary connectivity radio (PCR) transceiver; a wake-up radio (WUR) receiver; and a processor to receive a WUR identifier (WID) for identifying the STA in a WUR mode and a group identifier (GID) for identifying a STA group to which the STA belongs through the PCR receiver, to receive a WUR frame for waking up a plurality of STAs by entering the WUR mode through the WUR receiver, and to determine whether to wake up based on whether the WUR frame includes the GID or the WID, wherein the GID may be allocated using a portion of an ID space available for WUR, and the WID may be allocated using a portion other than the portion of the ID space used for the GID.

The STA may transmit a response frame to the WUR frame through PCR after waking up when an address field of the WUR frame includes the GID.

The STA may attempt to detect the WID of the STA in a frame body of the WUR frame assuming that the frame body includes WIDs of the plurality of STAs when an address field of the WUR frame has 0 other than the GID or WID, and may determine to wake up when the WID of the STA is detected in the frame body.

The STA may receive one or more GIDs including the GID through a WUR mode response frame or a WUR mode suspend response frame.

When the WUR frame includes the GID, the WUR frame may further include a bitmap indicating a STA to be woken up in the group identified by the GID as a bit value of 1. The STA may determine a bit position corresponding to the STA in the bitmap through a modulo operation between the WID of the STA and the size of the bitmap. When a STA different from the STA is equally allocated the GID and the STA and the different STA have the same bit position in the bitmap, different WUR duty cycle on-durations may be set for the STA and the different STA.

According to an embodiment of the disclosure, since an ID space for WUR is divided into a space for a WID and a space for a GID, a GID can be distinguished from a WID even though being transmitted in an address field of a WUR frame, and an additional field for the GID does not need to be defined, thus preventing an increase in signaling overhead. Further, an AP may use a GID and may also, as necessary, use a WID in order to wake up a plurality of STAs, thus efficiently and accurately transmitting or receiving a WUR frame for waking up a plurality of STAs.

In addition to the foregoing technical effect, other technical effects may be inferred from embodiments of the present disclosure.

DESCRIPTION OF EXEMPLARY EMBODIMENTS

Hereinafter, preferred embodiments of the present disclosure will be described in detail with reference to the attached drawings. The detailed description, which will be given below with reference to the accompanying drawings, is intended to explain exemplary embodiments of the present disclosure, rather than to show the only embodiments that can be implemented according to the present disclosure.

While the following detailed description includes specific details in order to provide a thorough understanding of the present disclosure, it will be apparent to those skilled in the art that the present disclosure may be practiced without such specific details. In some instances, known structures and devices are omitted, or are shown in a block diagram form focusing on important features of the structures and devices, so as not to obscure the concept of the present disclosure.

As described above, a method for efficiently using a channel having a wide bandwidth in a wireless LAN system and a device therefor will be described below. For this, a wireless LAN system to which the present disclosure is applied will be described in detail first.

Figure 1:
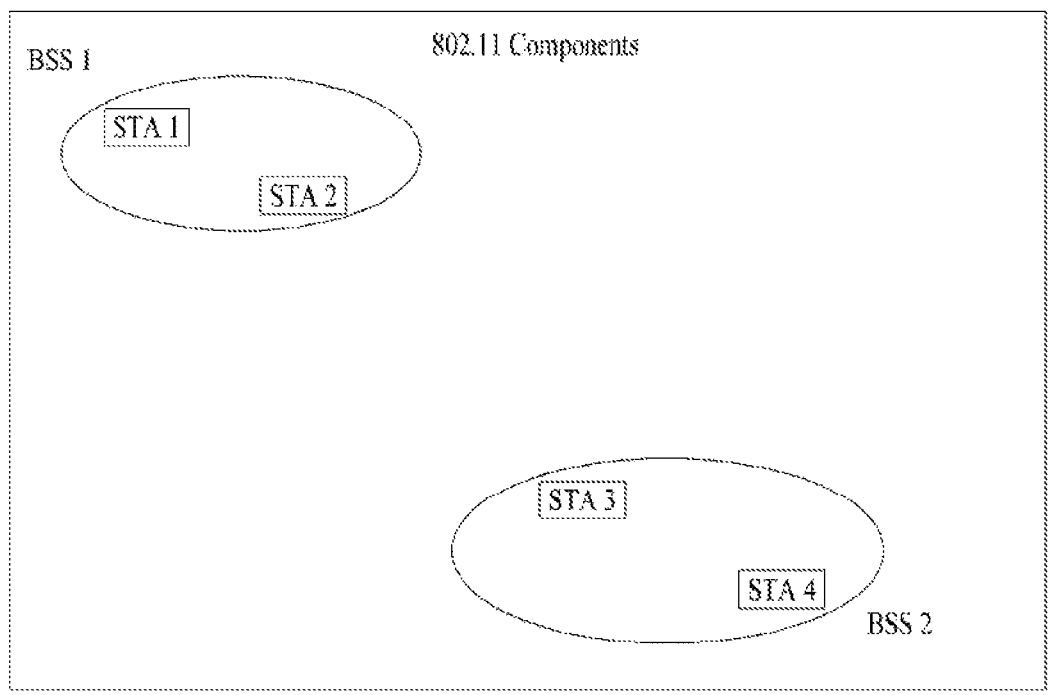
FIG. 1 illustrates an exemplary configuration of a wireless local area network (WLAN) system.

FIG. 1 is a diagram showing an example of a configuration of a wireless LAN system.

As illustrated in FIG. 1, the wireless LAN system includes at least one Basic Service Set (BSS). The BSS is a set of stations (STAs) that are able to communicate with each other by successfully performing synchronization.

An STA is a logical entity including a physical layer interface between a Media Access Control (MAC) layer and a wireless medium, and the STA includes an Access Point (AP) and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
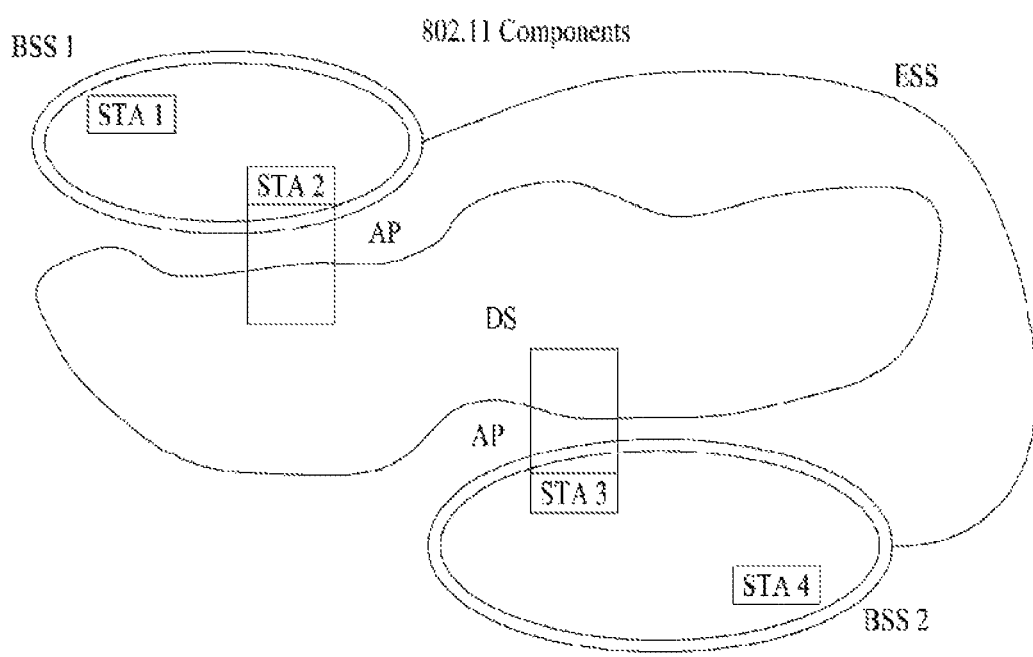
FIG. 2 illustrates another exemplary configuration of a WLAN system.

FIG. 2 is a diagram illustrating another example of a configuration of a wireless LAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Layer Structure

The operation of an STA operating in a wireless LAN system can be described in terms of a layer structure. The layer structure can be implemented by a processor in terms of device configuration. An STA may have a multi-layer structure. For example, a MAC sublayer and a physical layer (PHY) on a data link layer (DLL) are mainly handled in 802.11. The PHY may include a PLCP (Physical Layer Convergence Procedure) entity, a PMD (Physical Medium Dependent) entity, and the like. The MAC sublayer and PHY conceptually include management entities called an MLME (MAC sublayer Management Entity) and a PLME (Physical Layer Management Entity), respectively. These entities provide a layer management service interface that executes a layer management function.

In order to provide correct MAC operation, an SME (Station Management Entity is present within each STA. The SME is a layer independent entity that can be viewed as residing in a separate management plane or as residing "off to the side." The exact functions of the SME are not specified in this document, but in general this entity can be viewed as being responsible for such functions as the gathering of layer-dependent status from the various layer management entities (LMEs) and similarly setting the value of layer-specific parameters. The SME may typically perform such functions on behalf of general system management entities and implement standard management protocols.

The aforementioned entities interact in various ways. For example, entities can interact by exchanging GET/SET primitives. A primitive refers to a set of elements or parameters related to a specific purpose. XX-GET.request primitive is used to request the value of a given MIB attribute (management information based attribute information). XX-GET.confirm primitive is used to return an appropriate MIB attribute value if status="success," otherwise return an error indication in the Status field. XX-SET.request primitive is used to request that an indicated MIB attribute be set to a given value. If this MIB attribute implies a specific action, then this requests that the action be performed. XX-SET.confirm primitive is used such that, if status="success," this confirms that the indicated MIB attribute was set to the requested value, otherwise it returns an error condition in Status field. If this MIB attribute implies a specific action, then this confirms that the action was performed.

Also, various MLME_GET/SET primitives may be exchanged between MLME and SME via MLME_SAP (Service Access Point). Further, various PLME_GET/SET primitives may be exchanged between PLME and SME via PLME_SAP and between MLME and PLME via MLME-PLME_SAP.

Link Setup Process

Figure 3:
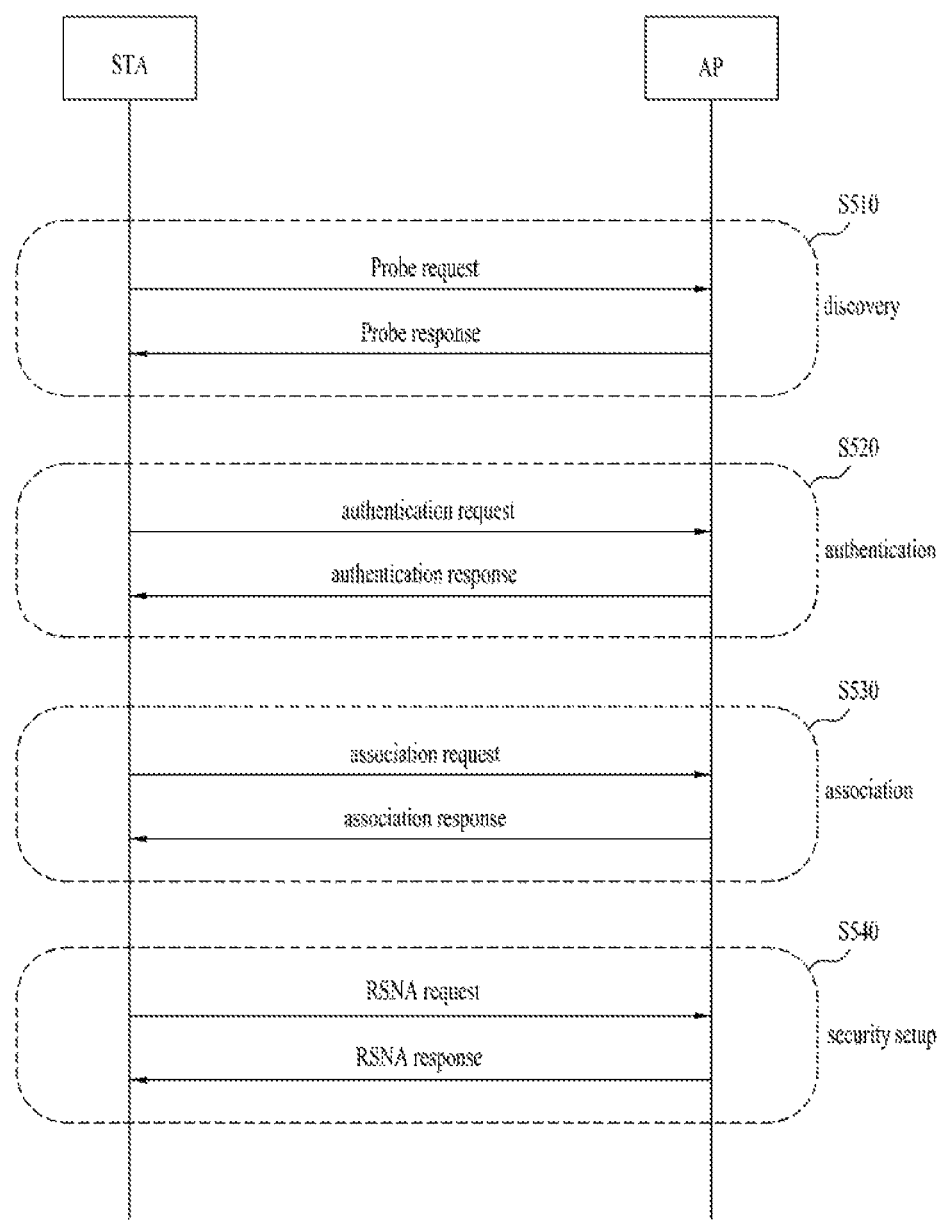
FIG. 3 illustrates a general link setup process.

FIG. 3 is a diagram illustrating a general link setup process.

To set up a link for a network and transmit/receive data, an STA needs to discover the network, perform authentication, establish association and perform an authentication process for security. A link setup process may also be referred to as a session initiation process or a session setup process. In addition, discovery, authentication, association and security setting of the link setup process may be collectively referred to as an association process.

An exemplary link setup process will be described with reference to FIG. 3.

An ST performs a network discovery operation in step S510. The network discovery operation may include a scanning operation of the STA. That is, in order to access a network, the STA need to discovery networks in which the STA can participate. The STA needs to identify a compatible network before participating in a wireless network. A process of identifying a network present in a specific area is referred to as scanning.

Scanning includes active scanning and passive scanning.

FIG. 3 illustrates an exemplary network discovery operation including active scanning. The STA that performs active scanning transmits a probe request frame in order to scan neighboring APs while moving between channels and waits for a response thereto. A responder transmits a probe response frame in response to the probe request frame to the STA that has transmitted the probe request frame. Here, the responder may be an STA that has transmitted a final beacon frame in a BSS of a channel that is being scanned. In a BSS, an AP is a responder in a BSS because the AP transmits a beacon frame. In an IBSS, a responder is not fixed because STAs in the IBSS transmit beacon frames by turns. For example, an STA that has transmitted a probe request frame on channel #1 and received a probe response frame on channel #1 may store BSS related information included in the received probe response frame, move to the next channel (e.g., channel #2) and perform scanning (i.e., transmission/reception of a probe request/response on channel #2) through the same method.

Although not shown in FIG. 3, passive scanning may be performed as a scanning operation. An STA that performs passive scanning waits for a beacon frame while moving between channels. A beacon frame is a management frame in IEEE 802.11 and is periodically transmitted to indicate presence of a wireless network and allow an STA performing scanning to discover the wireless network and participate in the wireless network. An AP serves to periodically transmit a beacon frame in a BSS and STAs transmit beacon frames by turns in an IBSS. An STA performing scanning stores information about a BSS included in a beacon frame upon reception of the beacon frame and records beacon frame information in each channel while moving to other channels. The STA that has received a beacon frame may store BSS related information included in the received beacon frame, move to the next channel and perform scanning in the next channel through the same method.

Active scanning has the advantages of less delay and less power consumption as compared to passive scanning.

After the STA discovers the network, the authentication process may be performed in step S520. This authentication process may be referred to as a first authentication process to be clearly distinguished from a security setup process of step S540 which will be described later.

The authentication process includes a process in which the STA transmits an authentication request frame to the AP and the AP transmits an authentication response frame in response thereto to the STA. An authentication frame used for an authentication request/response corresponds to a management frame.

The authentication frame may include information about an authentication algorithm number, an authentication transaction sequence number, status code, challenge text, an RSN (Robust Security Network), a finite cyclic group, and the like. This corresponds to examples of some of information that may be included in the authentication request/response and may be replaced by other types of information or further include additional information.

The STA may transmit the authentication request frame to the AP. The AP may determine whether to permit authentication of the STA based on information included in the received authentication request frame. The AP may provide an authentication processing result to the STA through the authentication response frame.

After successful authentication of the STA, the association process may be performed in step S530. The association process includes a process in which the STA transmits an association request frame to the AP and the AP transmits an association response frame in response thereto to the STA.

For example, the association request frame may include information related to various capabilities and information about a beacon listen interval, an SSID (service set identifier), supported rates, supported channels, an RSN, mobile domains, supported operating classes, a traffic indication map (TIM) broadcast request, interworking service capability, and the like.

For example, the association response frame may include information related to various capabilities and information about status code, an AID (Association ID), supported rates, an EDCA (Enhanced Distributed Channel Access) parameter set, an RCPI (Received Channel Power Indicator), an RSNI (Received Signal to Noise Indicator), mobile domains, a timeout interval (association comeback time), overlapping BSS scan parameters, TIM broadcast response, a QoS map, and the like.

This corresponds to examples of some of information that may be included in association request/response frame and may be replaced by other types of information or further include additional information.

After successful association of the STA with the network, the security setup process may be performed in step S540. The security setup process of step S540 may also be referred to an authentication process through an RSNA (Robust Security Network Association) request/response, the authentication process of step S520 may also be referred to as a first authentication process and the security setup process of step S540 may also be simply referred to as an authentication process.

The security setup process of step S540 may include a private key setup process through 4-way handshaking using an EAPOL (Extensible Authentication Protocol over LAN) frame, for example. Further, the security setup process may be performed according to a security scheme that is not defined in IEEE 802.11.

Medium Access Mechanism

In a wireless LAN system according to IEEE 802.11, the basic access mechanism of medium access control (MAC) is a carrier sense multiple access with collision avoidance (CSMA/CA) mechanism. The CSMA/CA mechanism is also referred to as a distributed coordination function (DCF) of IEEE 802.11 MAC and employs a "listen before talk" access mechanism. According to such an access mechanism, the AP and/or the STA may perform clear channel assessment (CCA) for sensing a radio channel or medium during a predetermined time interval (for example, a DCF interframe space (DIFS)) before starting transmission. If it is determined that the medium is in an idle state as the sensed result, frame transmission starts via the medium. If it is determined that the medium is in an occupied state, the AP and/or the STA may set and wait for a delay period (e.g., a random backoff period) for medium access without starting transmission and then attempt to perform frame transmission. Since it is expected that several STAs attempt to perform frame transmission after waiting for different times by applying the random backoff period, it is possible to minimize collision.

In addition, the IEEE 802.11 MAC protocol provides a hybrid coordination function (HCF). The HCF is based on the DCF and a point coordination function (PCF). The PCF refers to a periodic polling method for enabling all reception APs and/or STAs to receive data frames using a polling based synchronous access method. In addition, the HCF has enhanced distributed channel access (EDCA) and HCF controlled channel access (HCCA). The EDCA uses a contention access method for providing data frames to a plurality of users by a provider and the HCCA uses a contention-free channel access method using a polling mechanism. In addition, the HCF includes a medium access mechanism for improving quality of service (QoS) of a WLAN and may transmit QoS data both in a contention period (CP) and a contention free period (CFP).

Figure 4:
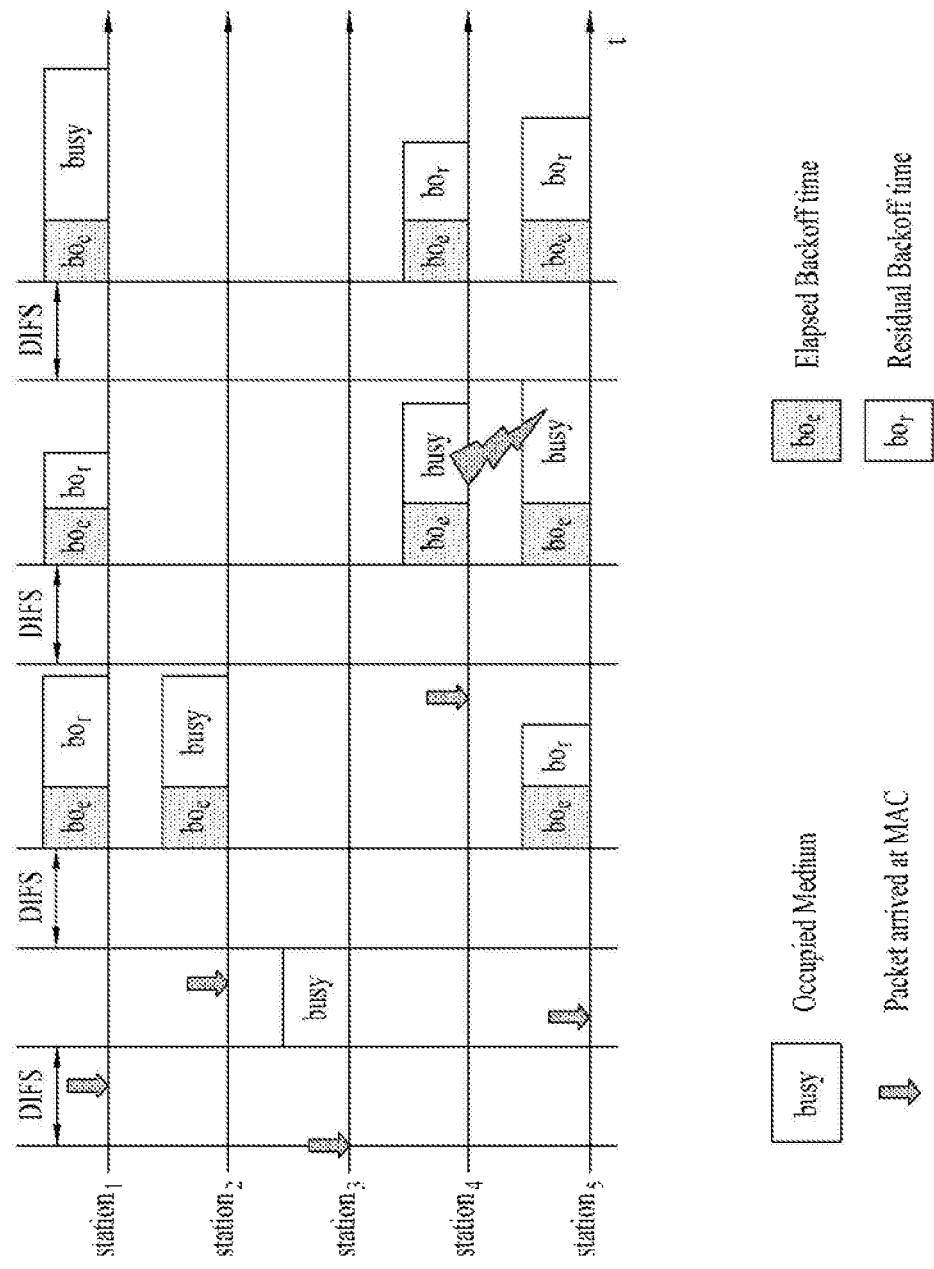
FIG. 4 illustrates a backoff process.

FIG. 4 is a diagram illustrating a backoff process.

Operation based on a random backoff period will be described with reference to FIG. 4. If a medium is changed from an occupied or busy state to an idle state, STAs may attempt data (or frame) transmission. At this time, as a method for minimizing collision, the STAs may select respective random backoff counts, wait for slot times corresponding to the random backoff counts and attempt transmission. The random backoff count has a pseudo-random integer and may be set to one of values of 0 to CW. Here, the CW is a contention window parameter value. The CW parameter is set to CWmin as an initial value but may be set to twice CWmin if transmission fails (e.g., ACK for the transmission frame is not received). If the CW parameter value becomes CWmax, data transmission may be attempted while maintaining the CWmax value until data transmission is successful. If data transmission is successful, the CW parameter value is reset to CWmin. CW, CWmin and CWmax values are preferably set to $2^n-1$ (n=0, 1, 2, . . . ).

If the random backoff process starts, the STA continuously monitors the medium while the backoff slots are counted down according to the set backoff count value. If the medium is in the occupied state, countdown is stopped and, if the medium is in the idle state, countdown is resumed.

In the example of FIG. 4, if packets to be transmitted to the MAC of STA3 arrive, STA3 may confirm that the medium is in the idle state during the DIFS and immediately transmit a frame. Meanwhile, the remaining STAs monitor that the medium is in the busy state and wait. During a wait time, data to be transmitted may be generated in STA1, STA2 and STA5. The STAs may wait for the DIFS if the medium is in the idle state and then count down the backoff slots according to the respectively selected random backoff count values. In the example of FIG. 4, STA2 selects a smallest backoff count value and STA1 selects a largest backoff count value. That is, the residual backoff time of STA5 is less than the residual backoff time of STA1 when STA2 completes backoff count and starts frame transmission. STA1 and STA5 stop countdown and wait while STA2 occupies the medium. If occupancy of the medium by STA2 ends and the medium enters the idle state, STA1 and STA5 wait for the DIFS and then resume countdown. That is, after the residual backoff slots corresponding to the residual backoff time are counted down, frame transmission may be started. Since the residual backoff time of STA5 is less than of STA1, STA5 starts frame transmission. If STA2 occupies the medium, data to be transmitted may be generated in the STA4. At this time, STA4 may wait for the DIFS if the medium enters the idle state, perform countdown according to a random backoff count value selected thereby, and start frame transmission. In the example of FIG. 4, the residual backoff time of STA5 accidentally matches the random backoff time of STA4. In this case, collision may occur between STA4 and STA5. If collision occurs, both STA4 and STA5 do not receive ACK and data transmission fails. In this case, STA4 and STA5 may double the CW value, select the respective random backoff count values and then perform countdown. STA1 may wait while the medium is busy due to transmission of STA4 and STA5, wait for the DIFS if the medium enters the idle state, and start frame transmission if the residual backoff time has elapsed.

Sensing Operation of STA

As described above, the CSMA/CA mechanism includes not only physical carrier sensing for directly sensing a medium by an AP and/or an STA but also virtual carrier sensing. Virtual carrier sensing solves a problem which may occur in medium access, such as a hidden node problem. For virtual carrier sensing, MAC of a wireless LAN may use a network allocation vector (NAV). The NAV refers to a value of a time until a medium becomes available, which is indicated to another AP and/or STA by an AP and/or an STA which are currently utilizing the medium or has rights to utilize the medium. Accordingly, the NAV value corresponds to a period of time when the medium will be used by the AP and/or the STA for transmitting the frame, and medium access of the STA which receives the NAV value is prohibited during that period of time. The NAV may be set according to the value of the "duration" field of a MAC header of a frame.

A robust collision detection mechanism for reducing collision has been introduced, which will be described with reference to FIGS. 5 and 7. Although a transmission range may not be equal to an actual carrier sensing range, for convenience, assume that the transmission range may be equal to the actual carrier sensing range.

Figure 5:
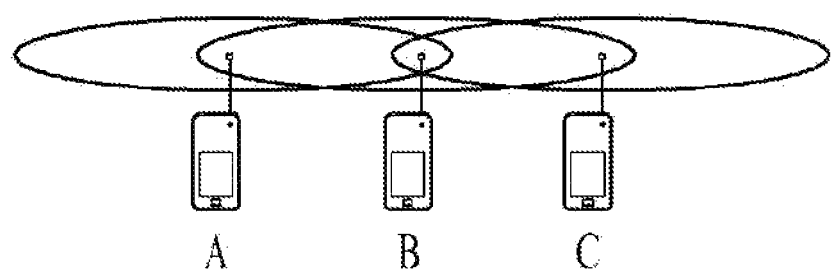
FIG. 5 illustrates a hidden node and an exposed node.
Figure 5:
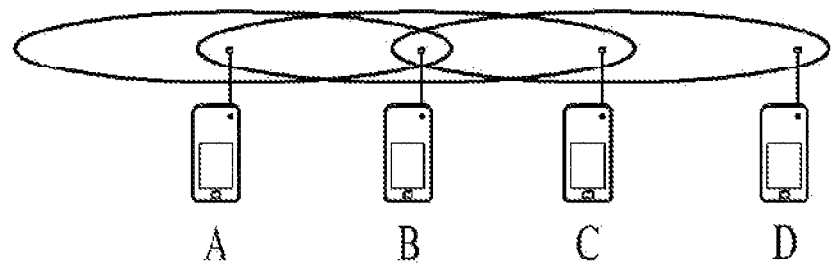

FIG. 5 is a diagram illustrating a hidden node and an exposed node.

FIG. 5(a) shows a hidden node, and, in this case, an STA A and an STA B are performing communication and an STA C has information to be transmitted. More specifically, although the STA A transmits information to the STA B, the STA C may determine that the medium is in the idle state when carrier sensing is performed before transmitting data to the STA B. This is because the STA C may not sense transmission of the STA A (that is, the medium is busy). In this case, since the STA B simultaneously receives information of the STA A and the STA C, collision occurs. At this time, the STA A may be a hidden node of the STA C.

FIG. 5(b) shows an exposed node and, in this case, the STA B transmits data to the STA A and the STA C has information to be transmitted to the STA D. In this case, if the STA C performs carrier sensing, it may be determined that the medium is busy due to transmission of the STA B. Accordingly, if the STA C has information to be transmitted to the STA D, the STA C waits until the medium enters the idle state since it is sensed that the medium is busy. However, since the STA A is actually outside the transmission range of the STA C, transmission from the STA C and transmission from the STA B may not collide from the viewpoint of the STA A. Therefore, the STA C unnecessarily waits until transmission of the STA B is stopped. At this time, the STA C may be an exposed node of the STA B.

Figure 6:
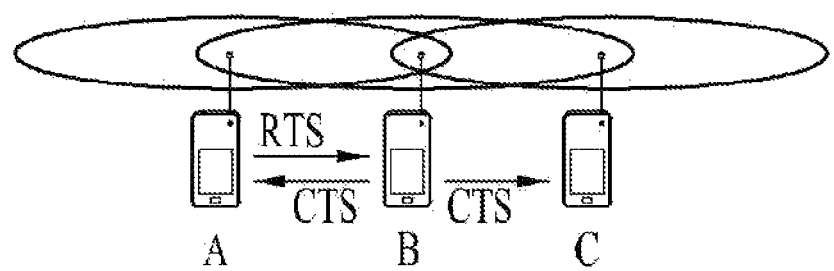
FIG. 6 illustrates RTS and CTS.
Figure 6:
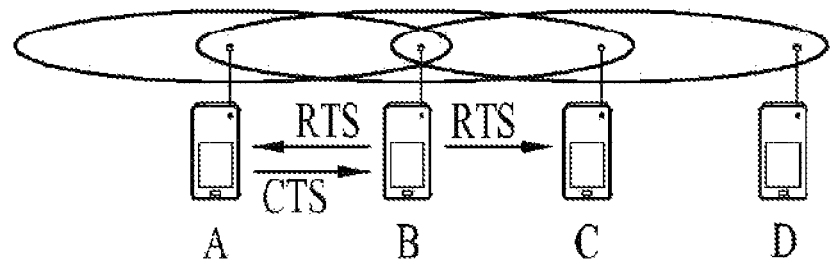

FIG. 6 is a diagram illustrating RTS and CTS.

In the example of FIG. 5, in order to efficiently use a collision avoidance mechanism, short signaling packet such as RTS (request to send) and CTS (clear to send) may be used. RST/CTS between two STAs may be enabled to be overheard by peripheral STAs such that the peripheral STAs confirm information transmission between the two STAs. For example, if a transmission STA transmits an RTS frame to a reception STA, the reception STA transmits a CTS frame to peripheral UEs to inform the peripheral UEs that the reception STA receives data.

FIG. 6(a) shows a method for solving a hidden node problem. Assume that both the STA A and the STA C attempt to transmit data to the STA B. If the STA A transmits the RTS to the STA B, the STA B transmits the CTS to the peripheral STA A and STA C. As a result, the STA C waits until data transmission of the STA A and the STA B is finished, thereby avoiding collision.

FIG. 6(b) shows a method of solving an exposed node problem. The STA C may overhear RTS/CTS transmission between the STA A and the STA B and determine that collision does not occur even when the STA C transmits data to another STA (e.g., the STA D). That is, the STA B transmits the RTS to all peripheral UEs and transmits the CTS only to the STA A having data to be actually transmitted. Since the STA C receives the RTS but does not receive the CTS from the STA A, it can be ascertained that the STA A is outside carrier sensing of the STA C.

Power Management

As described above, in a WLAN system, channel sensing should be performed before an STA performs transmission and reception. When the channel is always sensed, continuous power consumption of the STA is caused. Power consumption in a reception state is not substantially different from power consumption in a transmission state and continuously maintaining the reception state imposes a burden on an STA with limited power (that is, operated by a battery). Accordingly, if a reception standby state is maintained such that the STA continuously senses the channel, power is inefficiently consumed without any special advantage in terms of WLAN throughput. In order to solve such a problem, a power management (PM) mode of the STA is supported in a WLAN system.

The PM mode of STAs is divided into an active mode and a power save (PS) mode. STAs fundamentally operate in an active mode. An STA which operates in the active mode is maintained in an awake state. The awake state refers to a state in which normal operation such as frame transmission and reception or channel scanning is possible. An STA which operates in the PS mode operates while switching between a sleep state or an awake state. An STA which operates in the sleep state operates with minimum power and does not perform frame transmission and reception or channel scanning.

Since power consumption is reduced as the sleep state of the STA is increased, the operation period of the STA is increased. However, since frame transmission and reception are impossible in the sleep state, the STA cannot unconditionally operate in the sleep state. If a frame to be transmitted from the STA operating in the sleep state to an AP is present, the STA may be switched to the awake state to transmit the frame. If a frame to be transmitted from the AP to the STA is present, the STA in the sleep state cannot receive the frame and cannot confirm that the frame to be received is present. Accordingly, the STA may need to perform an operation for switching to the awake state according to a specific period in order to confirm presence of the frame to be transmitted thereto (to receive the frame if the frame to be transmitted is present).

An AP may transmit beacon frames to STAs within a BSS at a predetermined period. The beacon frame may include a traffic indication map (TIM) information element. The TIM information element includes information indicating that buffered traffic for STAs associated with the AP 210 is present and the AP will transmit a frame. The TIM element includes a TIM used to indicate a unicast frame or a delivery traffic indication map (DTIM) used to indicate a multicast or broadcast frame.

Figure 7:
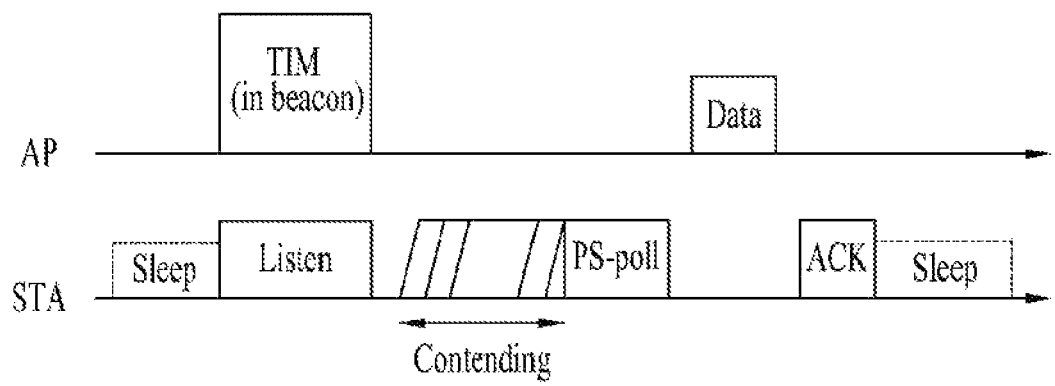
FIG. 7 to FIG. 9 illustrate an operation of an STA which has received a TIM.
Figure 8:
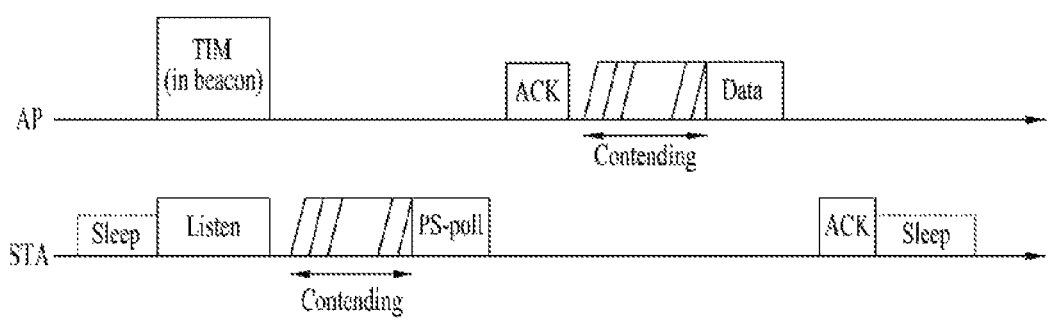
Figure 9:
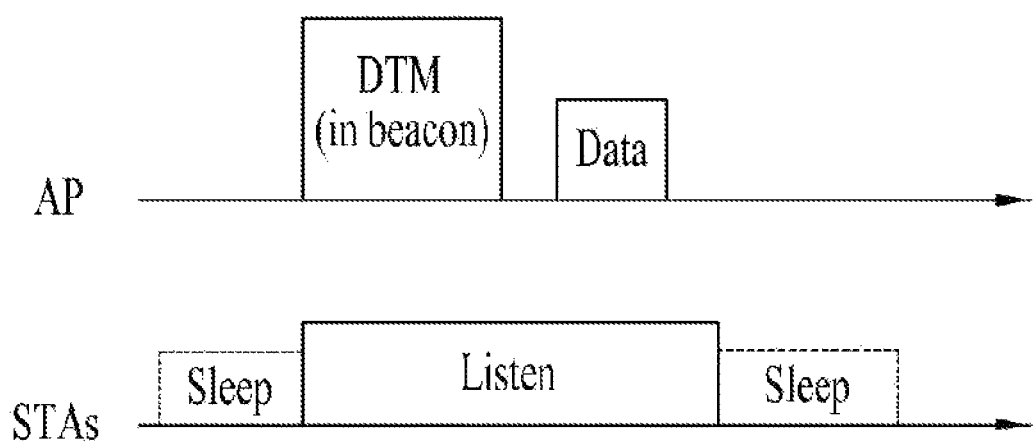

FIGS. 7 to 9 are diagrams illustrating an operation of an STA which receives a TIM in detail.

Referring to FIG. 7, an STA may switch from a sleep state to an awake state in order to receive a beacon frame including a TIM from an AP and interpret the received TIM element to confirm that buffered traffic to be transmitted thereto is present. The STA may contend with other STAs for medium access for transmitting a PS-Poll frame and then transmit the PS-Poll frame in order to request data frame transmission from the AP. The AP which has received the PS-Poll frame transmitted by the STA may transmit the frame to the STA. The STA may receive the data frame and transmit an ACK frame to the AP. Thereafter, the STA may switch to the sleep state.

As shown in FIG. 7, the AP may receive the PS-Poll frame from the STA and then operate according to an immediate response method for transmitting a data frame after a predetermined time (e.g., a short inter-frame space (SIFS)). If the AP does not prepare a data frame to be transmitted to the STA during the SIFS after receiving the PS-Poll frame, the AP may operate according to a deferred response method, which will be described with reference to FIG. 8.

In the example of FIG. 8, the operation of the STA to switch from the sleep state to the awake state, receive a TIM from the AP, perform contending and transmit a PS-Poll frame to the AP is the same as that of FIG. 7. If the data frame is not prepared during the SIFS even when the AP receives the PS-Poll frame, an ACK frame instead of the data frame may be transmitted to the STA. If the data frame is prepared after transmitting the ACK frame, the AP may perform contending and then transmit the data frame to the STA. The STA may transmit an ACK frame indicating that the data frame has been successfully received to the AP and may switch to the sleep state.

FIG. 9 shows an example in which the AP transmits the DTIM. STAs may switch from the sleep state to the awake state in order to receive a beacon frame including the DTIM element from the AP. The STAs may ascertain that a multicast/broadcast frame will be transmitted via the received DTIM. The AP may immediately transmit data (that is, a multicast/broadcast frame) without PS-Poll frame transmission and reception after transmitting the beacon frame including the DTIM. The STAs may receive data in the awake state after receiving the beacon frame including the DTIM and may switch to the sleep state after completing data reception.

General Frame Structure

Figure 10:
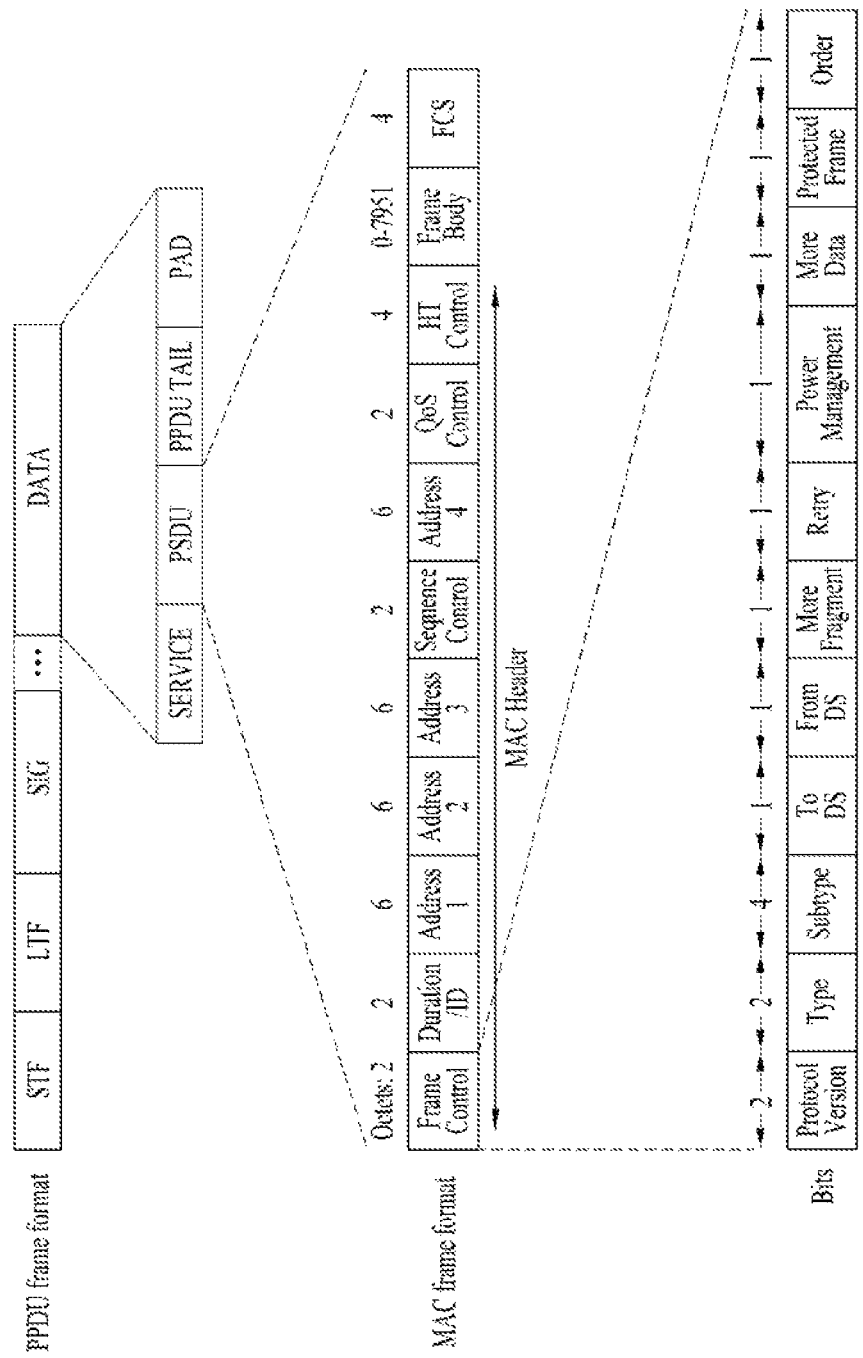
FIG. 10 illustrates an exemplary frame structure used in an IEEE 802.11 system.

FIG. 10 is a diagram illustrating an example of a frame structure used in IEEE 802.11.

A physical layer protocol data unit (PPDU) frame format may include a short training field (STF), a long training field (LTF), a signal (SIG) field and a data field. The most basic (e.g., non-HT (High Throughput)) PPDU frame format may include only legacy-STF (L-STF), legacy-LTF (L-LTF), the SIG field and the data field.

The STF is a signal for signal detection, automatic gain control (AGC), diversity selection, accurate synchronization, and the like and the LTF is a signal for channel estimation, frequency error estimation, and the like. The STF and the LTF may be collectively referred to as a PLCP preamble, and the PLCP preamble may be a signal for synchronization of an OFDM physical layer and channel estimation.

The SIG field may include a RATE field and a LENGTH field. The RATE field may include information about data modulation and coding rate. The LENGTH field may include information about a data length. Additionally, the SIG field may include a parity bit, a SIG TAIL bit, and the like.

The data field may include a SERVICE field, a physical layer service data unit (PSDU), a PPDU TAIL bit and also include padding bits as necessary. Some bits of the SERVICE field may be used for synchronization of a descrambler at a receiving end. The PSDU corresponds to a MAC protocol data unit (MPDU) defined in the MAC layer and may include data generated/used by a higher layer. The PPDU TAIL bit can be used to return an encoder to 0 state. The padding bits can be used to adjust a data field length to a predetermined unit.

The MPDU is defined in various MAC frame formats and a basic MAC frame includes a MAC header, a frame body and a frame check sequence (FCS). The MAC frame includes a MPDU and may be transmitted/received through a PSDU of a PPDU frame format.

The MAC header includes a frame control field, a duration/ID field, and an address field. The frame control field may include control information necessary for frame transmission/reception. The duration/ID field may be set to a time for transmitting a corresponding frame.

The duration/ID field included in the MAC header may be set to a 16-bit length (e.g., B0 to B15). Content included in the duration/ID field may depend on a frame type and a sub-type, whether transmission is performed during a contention free period (CFP), QoS capability of a transmission STA, and the like. (i) In control frames having a sub-type of PS-Poll, the duration/ID field may include the AID of a transmission STA (e.g., through 14 LSBs) and 2 MSBs may be set to 1. (ii) In frames transmitted by a point coordinator (PC) or a non-QoS STA for the CFP, the duration/ID field may be set to a fixed value (e.g., 32768). (iii) In other frames transmitted by a non-QoS STA or control frames transmitted by a QoS STA, the duration/ID field may include a duration value defined per frame type. In a data frame or a management frame transmitted by a QoS STA, the duration/ID field may include a duration value defined for each frame type. For example, if B15 of the duration/ID field is set to B15=0, it indicates that the duration/ID field is used to indicate a TXOP duration, and B0 to B14 may be used to indicate an actual TXOP duration. The actual TXOP duration indicated by B0 to B14 may be any one of 0 to 32767 and the unit thereof may be microsecond (p). However, when the duration/ID field indicates a fixed TXOP duration value (e.g., 32768), B15=1 and B0 to B14=0. If B14=1 and B15=1, the duration/ID field is used to indicate an AID and B0 to B13 indicate one AID of 1 to 2007. Refer to IEEE 802.11 standard document for details of the sequence control, QoS control, HT control subfields of the MAC header.

The frame control field of the MAC header may include Protocol Version, Type, Subtype, To DS, From DS, More Fragment, Retry, Power Management, More Data, Protected Frame and Order subfields. Refer to IEEE 802.11 standard document for details of the subfields of the frame control field.

WUR (Wake-Up Radio)

First, a wake-up radio receiver (WURx) compatible with a WLAN system (e.g., 802.11) will be described with reference to FIG. 11.

Figure 11:
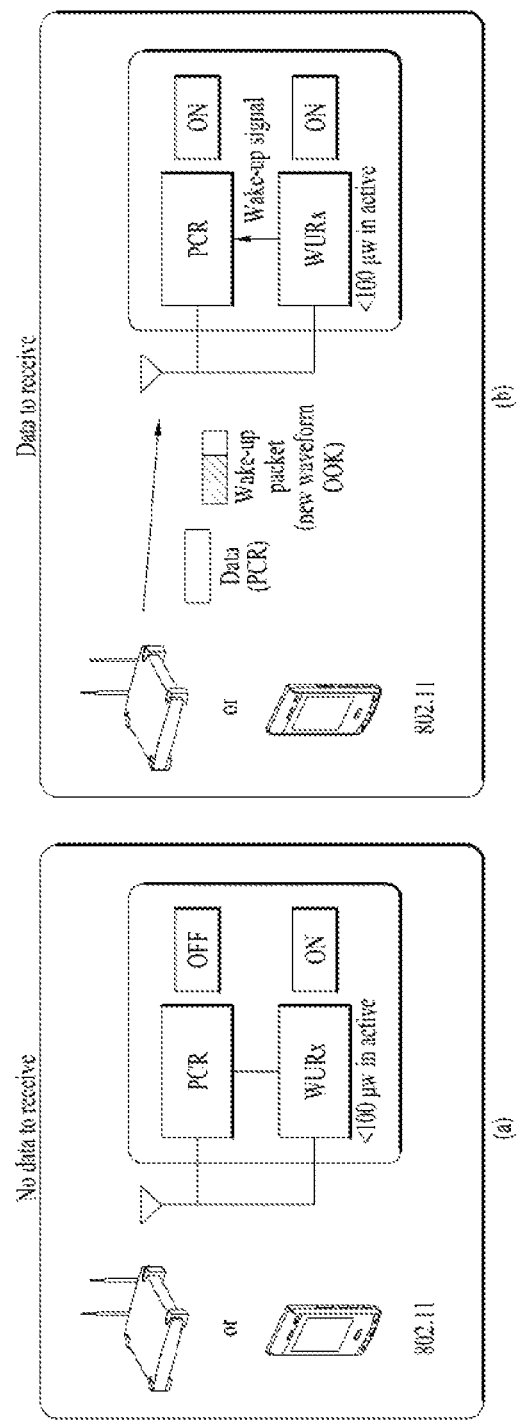
FIG. 11 illustrates a WUR receiver available for a WLAN system (e.g., 802.11).

Referring to FIG. 11, an STA may support primary connectivity radio (PCR) (e.g., IEEE 802.11a/b/g/n/ac/ax WLAN) and wake-up radio (WUR) (e.g., IEEE 802.11ba) for main wireless communication.

The PCR is used for data transmission and reception and may be turned off if there is no data to be transmitted/received. When the PCR is turned off, the WURx of the STA may wake up the PCR if there is a packet to be received. Accordingly, user data is transmitted and received through the PCR.

The WURx is not used for user data and may serve to wake a PCR transceiver up. The WURx may be a simple receiver that does not have a transmitter and is enabled while the PCR is turned off. It is desirable that target power consumption of the WURx do not exceed 100 microwatt (μW) in an enabled state. For such low-power operation, a simple modulation method, for example, on-off keying (OOK) may be used and a narrow bandwidth (e.g., 4 MHz or 5 MHz) may be used. A target reception range (e.g., distance) of the WURx may correspond to the current standard of IEEE 802.11.

Figure 12:
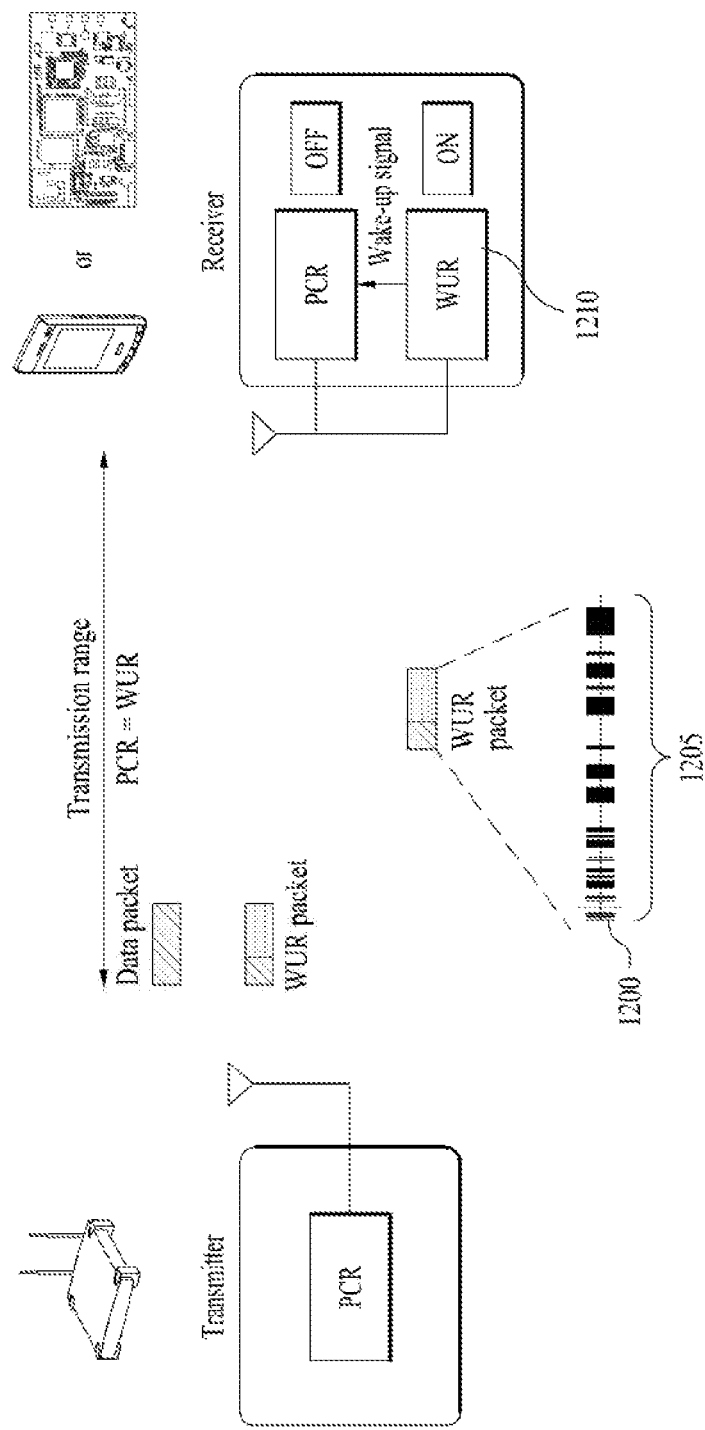
FIG. 12 illustrates an operation of a WUR receiver.

FIG. 12 is a diagram for explaining design and operation of a WUR packet.

Referring to FIG. 12, the WUR packet may include a PCR part 1200 and a WUR part 1205.

The PCR part 1200 is for coexistence with a legacy wireless LAN system and may also be called a wireless LAN preamble (e.g., 20 MHz non-HT preamble). At least one of L-STF, L-LTF and L-SIG of the legacy wireless LAN may be included in the PCR part 1200 in order to protect the WUR packet from other PCR STAs. Accordingly, a 3rd party legacy STA can ascertain that the WUR packet is not intended therefor and a medium of PCR has been occupied by another STA through the PCR part 1200. A WURx does not decode the PCR part of the WUR packet because the WURx supporting narrow bands and OOK demodulation does not support PCR signal reception. A 1 BPSK symbol having a tone interval of 312.5 kHz and a duration of 4 μs is transmitted immediately after the L-SIG field.

At least a part of the WUR part 1205 may be a part modulated according to on-off keying (OOK). For example, the WUR part may include a WUR synchronization field and a WUR data field (e.g., WUR MAC frame). The WUR data field may include at least one of a MAC header (e.g., receiver address and the like), a frame body, and a frame check sequence (FCS). Meanwhile, OOK modulation may be performed by modifying an OFDM transmitter.

The WUR synchronization field of the WUR part may also be called a preamble. For example, the preamble of the WUR part and the 20 MHz non-HT preamble of the PCR part may be collectively called a WUR preamble. The preamble of the WUR part may include a WUR synchronization sequence. The duration of the WUR synchronization sequence may vary according to a data rate applied to the WUR data field. Accordingly, the data rate may be indicated by the WUR synchronization sequence. The WUR synchronization sequence may be set to 128 μs in the case of a low data rate (e.g., 62.6 kbps) and set to 64 μs in the case of a high data rate (e.g., 250 kbps). A synchronization sequence of 64 μs corresponds to a 32-bit binary sequence S. Here, 1 bit corresponds to 2 μs. A synchronization sequence of 128 μs corresponds to a combination of the binary sequence S and a complementary sequence S* of the binary sequence S.

A WURx 1210 can be realized by a small and simple OOK demodulator which consumes very low power of less than 100 μW, as described above.

In this manner, a WUR packet needs to be designed to be compatible in wireless LAN systems and thus it may include a legacy wireless LAN preamble (e.g., OFDM) and a new LP-WUR signal waveforms (e.g., OOK).

Figure 13:
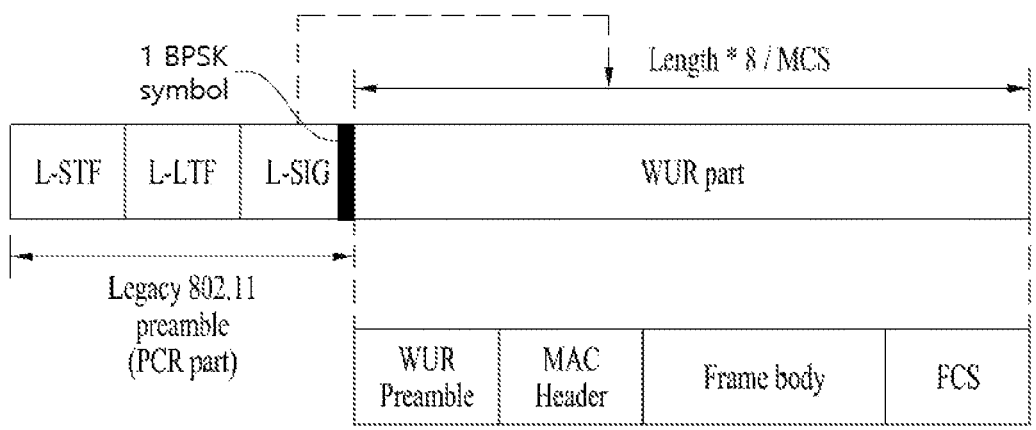
FIG. 13 illustrates an exemplary WUR packet.

FIG. 13 illustrates an example of a WUR packet. The WUR packet in FIG. 13 includes a PCR part (e.g., legacy wireless LAN preamble) for coexistence with legacy STAs.

Referring to FIG. 13, the legacy wireless LAN preamble may include L-STF, L-LTF and L-SIG. Further, a wireless LAN STA (e.g., 3rd party) may detect the end of the WUR packet through L-SIG. For example, the L-SIG field can indicate the length of a payload (e.g., OOK-modulated) of the WUR packet.

A WUR part may include at least one of a WUR synchronization field, a MAC header, a frame body and an FCS. The WUR synchronization field may include, for example, a PN sequence (e.g., the aforementioned 32-bit binary sequence S or S+S*). The MAC header may include an address field (e.g., a transmitter address and/or a receiver address). The frame body may include other pieces of information necessary for wake-up. The FCS may include a cyclic redundancy check.

Figure 14:
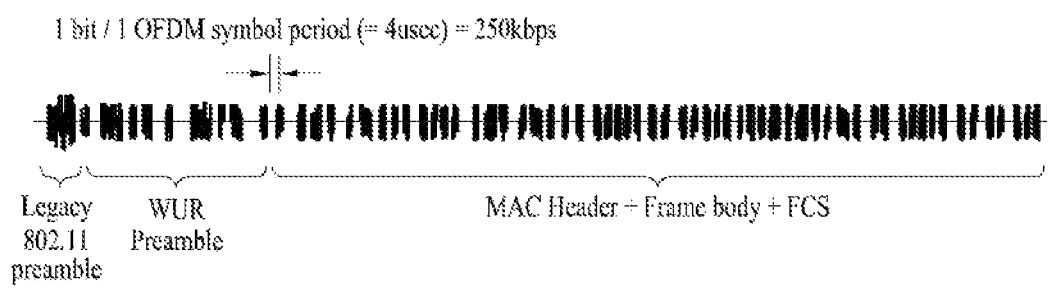
FIG. 14 illustrates the waveform of a WUR packet.

FIG. 14 illustrates waveforms with respect to the WUR packet of FIG. 13. Referring to FIG. 14, 1 bit can be transmitted per OFDM symbol length (e.g., 4 μsec) in the OOK-modulated WUR part. Accordingly, a data rate in the data field of the WUR part may be 250 kbps. However, the present description is not limited to FIG. 14 and the data rate may be 62.5 kbps in the WUR data field.

Figure 15:
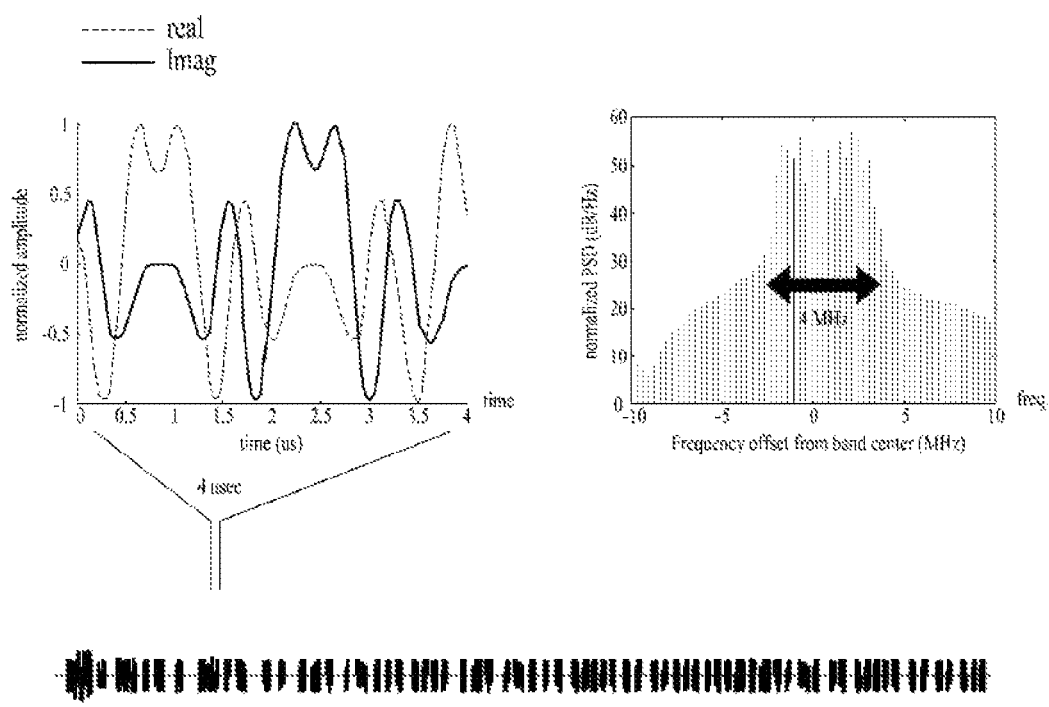
FIG. 15 illustrates a WUR packet generated using an OFDM transmitter of a WLAN.

FIG. 15 is a diagram for explaining generation of a WUR packet using an OFDM transmitter of a wireless LAN. A phase shift keying (PSK)-OFDM transmission technique is used in wireless LANs. Generation of a WUR packet by adding an additional OOK modulator for OOK modulation increases transmitter implementation costs. Accordingly, a method for generating an OOK-modulated WUR packet by reusing an OFDM transmitter will be described.

According to OOK modulation, a bit value 1 is modulated into a symbol (i.e., on) having arbitrary power loaded thereon or having power equal to or higher than a threshold value and a bit value 0 is modulated into a symbol (i.e., off) having no power loaded thereon or having power equal to or less than the threshold value. The bit value 1 may be defined as power off.

In this manner, the bit value 1/0 is indicated through power on/off at a corresponding symbol position in the OOK modulation. Such a simple OOK modulation/demodulation method cam reduce power consumption for signal detection/demodulation of a receiver and costs for realizing the same. Furthermore, OOK modulation for signal on/off may be performed by reusing a legacy OFDM transmitter.

The left graph of FIG. 15 shows a real part and an imaginary part of a normalized amplitude for 1 symbol period (e.g., 4 μsec) with respect to a bit value 1 that has been OOK-modulated by reusing an OFDM transmitter of a legacy wireless LAN. An OOK modulation result with respect to a bit value 0 corresponds to power off and thus illustration thereof is omitted.

The right graph of FIG. 15 shows a normalized power spectral density (PSD) in the frequency domain with respect to a bit value 1 that has been OOK-modulated by reusing an OFDM transmitter of a legacy wireless LAN. For example, the center frequency of 4 MHz in the corresponding bandwidth can be used for WUR. Although it is assumed that WUR operates in the bandwidth of 4 MHz in FIG. 15, this is for convenience of description and other frequency bandwidths may be used. However, it is desirable that WUR operate in a bandwidth narrower than the operating bandwidth of PCR (e.g., legacy wireless LAN) for power saving.

It is assumed that a subcarrier width (e.g., subcarrier spacing) is 312.5 kHz and an OOK pulse bandwidth corresponds to 13 subcarriers in FIG. 15. The 13 subcarriers correspond to about 4 MHz (i.e., 4.06 MHz=13*312.5 kHz), as mentioned above. The center subcarrier in the 4 MHz bandwidth may be nulled.

When an input sequence of inverse fast Fourier transform (IFFT) is defined as s={13 subcarrier tone sequence} in a legacy OFDM transmitter, IFFT for the sequence s is performed such that Xt=IFFT(s) and then a cyclic prefix (CP) having a length of 0.8 μsec is attached thereto, a symbol length of about 4 μs is obtained.

The WUR packet may also be called a WUR signal, a WUR frame or a WUR PPDU. The WUR packet may be a packet for broadcast/multicast (e.g., WUR beacon) or a packet for unicast (e.g., a packet for ending a WUR mode of a specific WUR STA and waking the specific WUR STA up).

Figure 16:
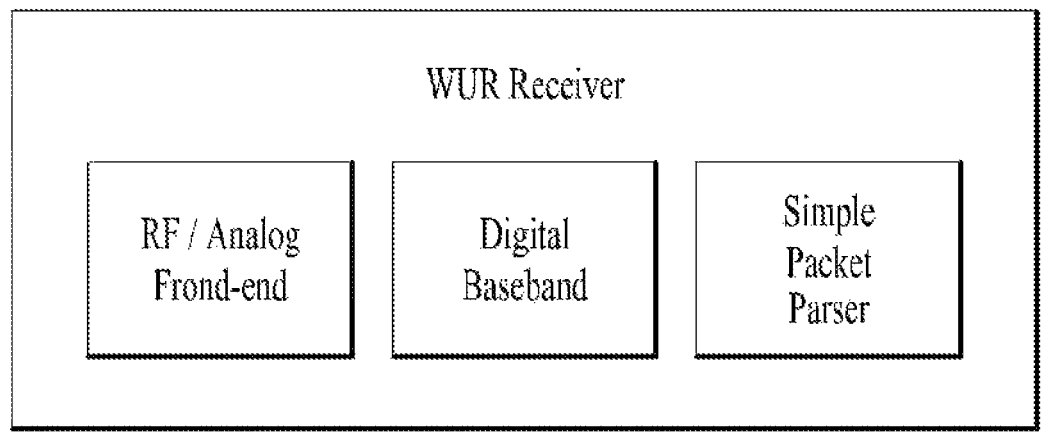
FIG. 16 illustrates the structure of a WUR receiver.

FIG. 16 illustrates a structure of a WUR receiver (WURx). Referring to FIG. 16, the WURx may include an RF/analog front-end, a digital baseband processor and a simple packet parser. FIG. 16 shows an exemplary configuration and the WUR receiver of the present description is not limited to FIG. 16.

Hereinafter, a WLAN STA including a WUR receiver is referred to as a simple WUR STA. A WUR STA may also be referred to as a simply STA.

Manchester coding based OOK modulation may be used for a WUR data field. The WUR data field can support multiple data rates (e.g., 62.5 kbps and 250 kbps). When Manchester coding is applied, a bit value 0 is represented as 2 μs ON symbol+2 μs OFF symbol and a bit value 1 is represented as 2 μs OFF symbol+2 μs ON symbol at 250 kbps. When Manchester coding is applied, a bit value 0 is represented as 4 μs ON symbol+4 μs OFF symbol+4 μs ON symbol+4 μs OFF symbol and a bit value 1 is represented as 4 μs OFF symbol+4 μs ON symbol+4 μs OFF symbol+4 μs ON symbol at 62.5 kbps.

In order for a WUR STA to ender a WUR mode, WUR mode signaling may be defined. For example, when explicit WUR mode signaling is used, WUR mode signaling may be performed through PCR and WUR operation parameters may be provided through WUR mode signaling. If an STA is in the WUR mode, the WURx of the STA can conform to a duty cycle schedule (including WURx always on) negotiated with an AP. If the STA is in the WUR mode, a service period previously negotiated between the AP and the STA with respect to PCR schedule TWT of the STA can be extended. When the service period is extended, the STA need not wake up for the service period and parameters of the negotiated service period are stored in the AP and the STA. If the STA is in the WUR mode and PCR of the STA is in a PS mode, the STA may not receive a PCR beacon frame.

A WUR action frame for WUR negotiation can be defined, and the WUR action frame includes a WUR identifier (WID) and may be transmitted through PCR. The WID uniquely identifies a WUR STA in a BSS of an AP. A WID included in a unicast wake-up frame identifies a receiver WUR STA.

An AP can used EDCA for WUR frame transmission. For example, the AP can transmit a WUR signal by reusing the legacy 4-access category (AC) and corresponding EDCA. The WUR signal may be, for example, a unicast wake-up packet, a multicast wake-up parameters packet, a broadcast wake-up packet or a WUR beacon but it is not limited thereto. The AP can use any AC for transmission of a WUR beacon or a multicast wake-up packet. If the AP does not have a buffered frame for an STA, the AP can use any AC for a unicast wake-up packet. After the AP transmits a WUR signal using EDCAF of a specific AC, the AP should not update reattempt counts of CW and AC. The AP should not update the reattempt counts of CW and AC when failure of a unicast wake-up packet transmitted using EDCACF of a specific AC is confirmed.

The AP transmits a unicast wake-up packet and then waits for the next timeout interval. When the AP has received any transmission from an STA for the timeout interval, wake-up packet transmission can be regarded as successful. On the other hand, when wake-up packet transmission fails, the AP retransmits the wake-up packet. The STA transmits a response frame to the AP through PCR after reception of the unicast wake-up packet.

To wake up a plurality of WUR mode STAs, a multi-user wake-up frame may be transmitted through a multicast/broadcast method. The AP may transmit a broadcast wake-up frame and then transmit a broadcast/multicast frame through PCR after a preparation period.

A WUR beacon frame may be periodically transmitted, and a beacon interval may be indicated in a WUR mode element. The WUR mode element may be transmitted through PCR. An address field of the WUR beacon frame includes the identifier of a transmitter (TxID). A TD control field of the WUR beacon frame may include a partial timing synchronization function (TSF) for synchronization.

After transmitting the wake-up packet to the STAs, the AP may transmit an 11ax trigger frame requesting a response frame from the STAs.

Figure 17:
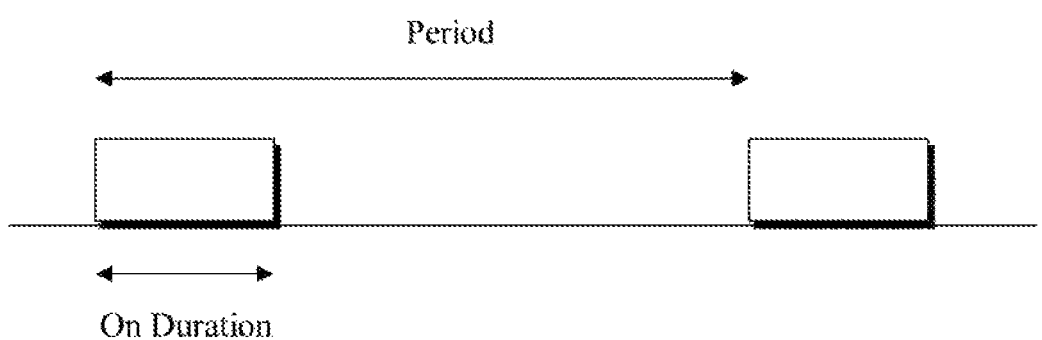
FIG. 17 illustrates a WUR duty cycle mode.

FIG. 17 illustrates a WUR duty cycle mode. A WUR receiver of a STA may operate in a duty cycle mode. The period of a WUR duty cycle may be a multiple of a basic unit, and the basic unit may be indicated by an AP. On-duration in the period of each WUR duty cycle is set to minimum wake-up duration or longer. The minimum wake-up duration may be indicated by the AP. The AP may determine the start point of a WUR duty cycle.

Figure 18:
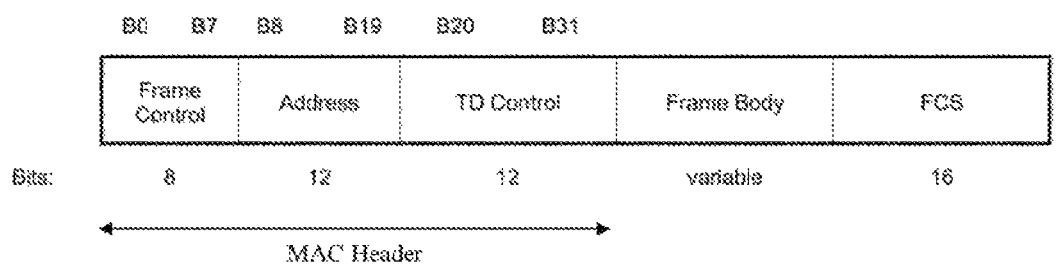
FIG. 18 illustrates the structure of a general WUR frame.

The structure of a general WUR frame (e.g., a MAC frame or a WUR data field of a WUR PPDU) will be described with reference to FIG. 18.

The length of a MAC header is fixed to 32 bits.

A frame control field of the MAC header includes a type subfield indicating a frame type (e.g., WUR beacon: 0, wake-up frame: 1, vendor-specific frame: 2, and the like), a length/misc. subfield, and reserved bits. The type subfield is used, along with the length/misc. subfield, to identify whether a WUR frame is a constant-length (CL) WUR frame or a variable-length (VL) WUR frame. In the VL WUR frame, the length/misc. subfield includes length information. In the VL WUR frame, the length/misc. subfield does not include length information, and corresponding bits may be used for other purposes.

An address field of the MAC header may be set to (i) a WID in a unicast wake-up frame, (ii) a group ID (GID) in a multicast wake-up frame, (iii) a TxID in a WUR beacon frame or broadcast wake-up frame, and (iv) OUI1 in a vendor-specific frame. The WID is provided by an AP for a STA and is used to identify one WUR STA. The GID is provided by the AP for the STA and is used to identify one or more STAs. The TxID is a transmitter identifier and is determined by the AP. OUI1 corresponds to 12 MSBs of an OUI.

A type-dependent (TD) control field of the MAC header includes type-dependent control information.

A frame body may be optionally provided in the WUR frame. For example, a STA may or may not support a frame body with a non-zero length. When the frame body is included in the WUR frame, the length of the frame body field may be indicated in a predetermined octet unit (e.g., up to 8 or 16 octets) in a length subfield of the frame control field.

A frame check sequence (FCS) includes the CRC of the WUR frame. The FCS may correspond to part of BSSID information.

The AP may indicate a BSS parameter update (e.g., PCR system information) or a group-addressed BU by increasing a counter included in a wake-up frame.

Multi-User Wake-Up Frame

Before describing MU grouping and GID allocation/indication methods in WUR, MU grouping in existing IEEE 802.11ac (i.e., VHT) is briefly described. In 11ac, 64 group IDs (GIDs) are supported. An AP may allocate at least one GID to a STA through a group ID management frame. The group ID management frame may include a membership status array field having a total size of 64 bits. The 64 bits of the membership status array field correspond to 64 GIDs, respectively, a bit value of 0 indicates that the STA is not a member of a corresponding group (i.e., a corresponding GID is not allocated to the STA), and a bit value of 1 indicates that the STA is a member of the corresponding group (i.e., the corresponding GID is allocated to the STA).

There are a total of four user positions in each group, and the STA may be allocated one user position among the four user positions of each group through a two-bit indication. Therefore, a group ID management frame includes a user position array field having a total size of 128 bits by multiplying two bits for indicating a user position in each group and 64 groups. That is, the user position array field provides a two-bit user position subfield for each of the 64 GIDs.

The AP may allocate a plurality of groups to one STA and may allocate a plurality of STAs to one user position. Further, some GID values may be used for SU transmission rather than MU transmission. For example, GID 0 indicates UL SU, and GID 63 indicates DL SU.

When GID allocation and user position indication are completed, the AP may transmit a VHT frame including a GID. A SIG-A1 field of the VHT frame includes a GID subfield and four MU Nsts subfields. The GID subfield has a size of six bits and indicates the GID of a group that needs to receive the VHT frame. The four MU Nsts subfields correspond to four user positions in the group. For example, a STA allocated an i-th user position in the group reads a MU[i] Nsts subfield.

Next, a MU WUR frame including a GID to wake up a WUR STA group according to embodiments of the disclosure is described.

Figure 19:
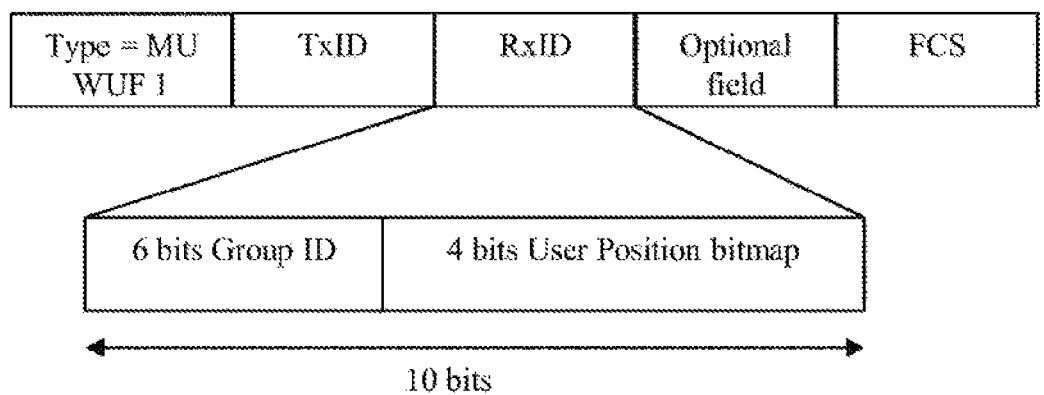
FIG. 19 illustrates the structure of a MU WUR frame (e.g., a MU wake-up frame (WUF)) including a GID to wake up a WUR STA group according to an embodiment of the disclosure.

FIG. 19 illustrates the structure of a MU WUR frame (e.g., a MU wake-up frame (WUF)) including a GID to wake up a WUR STA group according to an embodiment of the disclosure. As in FIG. 19 and examples illustrated below, a MU WUR frame including a group ID in an address field (e.g., an RxID field) may be referred to as a group-addressed WUR frame.

In FIG. 19, 11ac group management is reused for an MU WUR frame, in which an address field (e.g., an Rx ID field) of the MU WUR frame with Type=MU WUF 1 includes a GID subfield (e.g., six bits) and a user position bitmap subfield (e.g., four bits). The four bits of the user position bitmap may correspond to four user positions, respectively. The Rx ID field in the MU WUR frame of FIG. 19 uses ten bits and may thus have less overhead than a unicast wake-up frame including an 11-bit STA ID (e.g., AID).

Figure 20:
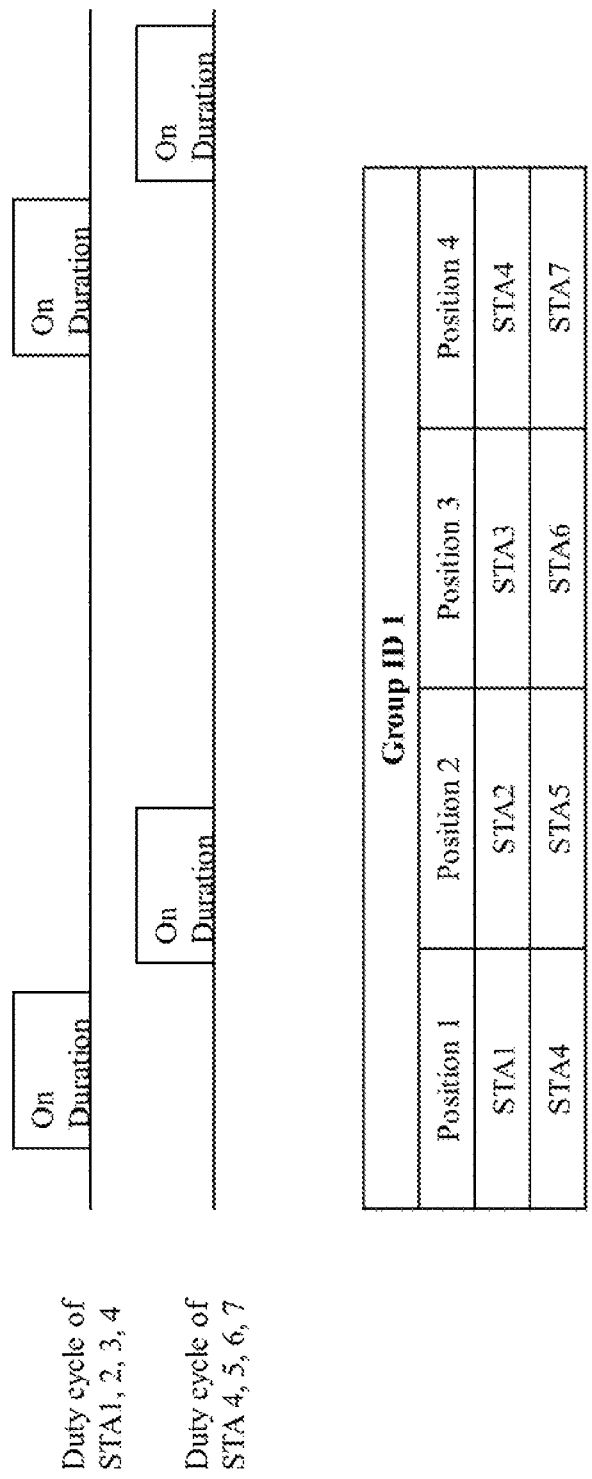
FIG. 20 illustrates a method for avoiding false wake-up according to an embodiment of the disclosure.

However, when a plurality of STAs is allocated to the same group ID and the same user position, the structure of FIG. 19 may incur false wake-up. FIG. 20 illustrates an example of a method that can be used along with the structure of FIG. 19 in order to reduce false wake-up.

Referring to FIG. 20, an AP may allocate different duty cycle on-durations to a plurality of STAs having the same group ID and the same user position. Alternatively, the AP may allocate a group (e.g., a GID) only to some STAs among all STAs.

Figure 21:
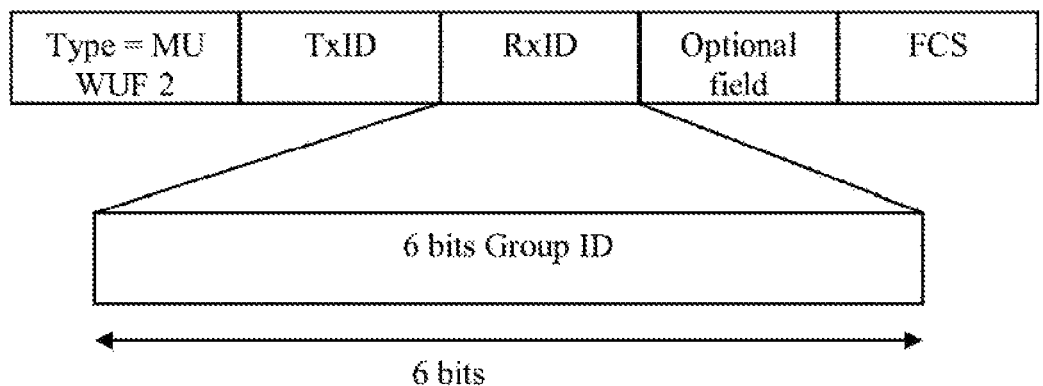
FIG. 21 illustrates the structure of a MU WUR frame (e.g., a MU WUF) including a GID to wake up a WUR STA group according to another embodiment of the disclosure.

FIG. 21 illustrates the structure of a MU WUR frame (e.g., a MU WUF) including a GID to wake up a WUR STA group according to another embodiment of the disclosure. Referring to FIG. 21, a user position bitmap is not provided for all STAs in a group. In FIG. 21, it is assumed that a GID is six bits for convenience of description, but the disclosure is not limited thereto.

Figure 22:
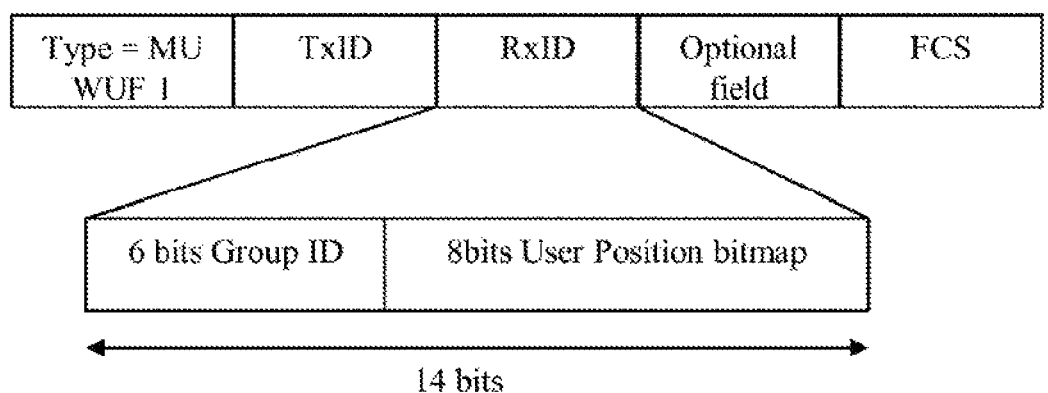
FIG. 22 illustrates the structure of a MU WUR frame (e.g., a MU WUF) including a GID to wake up a WUR STA group according to still another embodiment of the disclosure.

FIG. 22 illustrates the structure of a MU WUR frame (e.g., a MU WUF) including a GID to wake up a WUR STA group according to still another embodiment of the disclosure. Compared to FIG. 19, a user position bitmap is extended to eight bits in FIG. 22. According to the structure of FIG. 22, it is possible to support a larger number of STAs in one group without increasing false wake-up. For example, the eight bits of the user position bitmap may mean that there are eight user positions in a group. Since the number of user positions in a group is increased from four to eight, a user position subfield used to indicate the position of a STA in a group needs to be modified from two bits to three bits.

According to another embodiment of the disclosure, it is also possible to indicate whether a MU WUR frame provided with a user position bitmap (e.g., FIG. 19/FIG. 22) is used or a MU WUR frame not provided with a user position bitmap (e.g., FIG. 21) through a type field (e.g., a type field of a MAC header) of a MU WUR frame. For example, when type field=MU WUF1 is set, a user position bitmap may be provided in a MU WUR frame; when type field=MU WUF2 is set, a user position bitmap may not be provided in a MU WUR frame.

Figure 23:
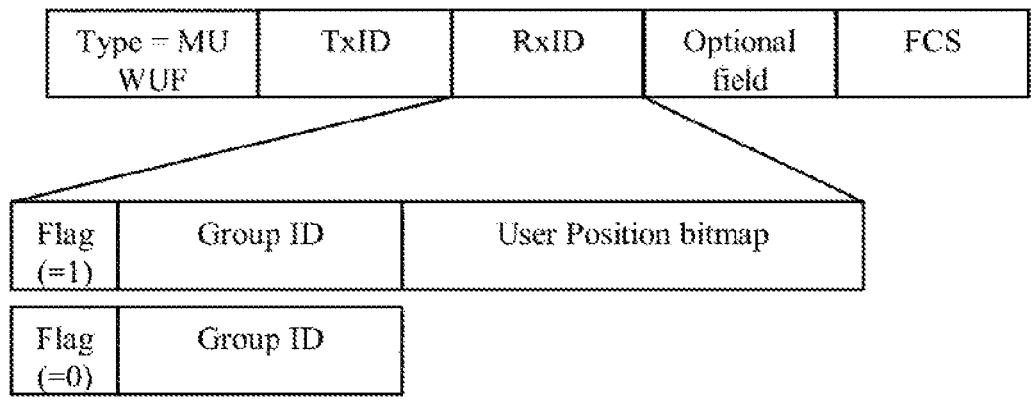
FIG. 23 illustrates the structure of a MU WUR frame (e.g., a MU WUF) including a GID to wake up a WUR STA group according to yet another embodiment of the disclosure.

FIG. 23 illustrates the structure of a MU WUR frame (e.g., a MU WUF) including a GID to wake up a WUR STA group according to yet another embodiment of the disclosure. Referring to FIG. 23, only one type of a MU WUR frame is defined. Accordingly, a type field may indicate only that the frame is a MU WUR frame including a GID. However, a flag indicating whether a user position bitmap is provided may be included in an RxID field. For example, flag=1 may indicate that a user position bitmap is provided, and flag=0 may indicate that a user position bitmap is not provided.

Next, a method for allocating a GID included in a MU WUR frame according to an embodiment of the disclosure is described.

Assuming that an AP transmits a PCR frame (e.g., a group ID management frame) in order to allocate a group (e.g., a GID) to a STA, the AP may transmit at least one of a membership status array field indicating a group ID and a user position array field indicating the position of the STA (e.g., user position) in the group via the PCR frame (e.g., the group ID management frame) as in 11ac.

Alternatively, instead of indicating the position of the STA in the group through the user position array field, the STA may implicitly determine the position thereof in the group using an allocated ID. In this case, the user position array field may be omitted from the group ID management frame.

According to an illustrative method of determining a STA position in a group through an ID (e.g., a STA ID), a user position may be determined by STA ID modulo X. The STA ID may be, for example, an AID assigned through PCR or a WUR ID but is not limited thereto. X may indicate a bitmap size (e.g., four or eight bits). The value obtained by STA ID modulo X may indicate a STA position in a user position bitmap (e.g., the user position bitmaps included in the MU WUR frames of FIG. 19 and FIG. 22 to FIG. 23).

Specifically, it is assumed that STA1's ID=1, STA2's ID=2, STA3's ID=3, STA4's ID=4, STA5's ID=5, STA6's ID=6, STA7's ID=7, and STA8's ID=8. When the user position bitmap has a four-bit size, the positions of the STAs in the group may be determined as shown in Table 1. When the user position bitmap has an eight-bit size, the positions of the STAs in the group may be determined as shown in Table 2.

TABLE 1

| Bitmap [0] | Bitmap [1] | Bitmap [2] | Bitmap [4] |
|---|---|---|---|
| STA4 | STA1 | STA2 | STA3 |
| STA8 | STA5 | STA6 | STA7 |

TABLE 2

| Bitmap[0] | Bitmap[1] | Bitmap[2] | Bitmap[3] | Bitmap[4] | Bitmap[5] | Bitmap[6] | Bitmap[7] |
|---|---|---|---|---|---|---|---|
| STA8 | STA1 | STA2 | STA3 | STA4 | STA5 | STA6 | STA7 |

Hereinafter, other examples of a MU WUR frame for waking up a plurality of STAs are described. A MU WUR frame illustrated below may be a WUR frame indicating a plurality of STAs to be woken up using a group ID (e.g., where an address field of a MAC header is set to a group ID) or a WUR frame including the WIDs of a plurality of STAs to be woken up (e.g., including a WID list in a frame body).

According to an embodiment of the disclosure, when a frame type of a MAC header indicates a MU WUR frame, a group ID (e.g., eight bits) and a partial TSF (e.g., eight bits) may be included in the WUR frame (e.g., the MAC header). For example, the partial TSF may be included in a TD control field of the MAC header. Further, a frame body (FD) length may be indicated in the MAC header of the WUR frame.

In the MU WUR frame, when the group ID has a special value (e.g., 0 or all bits set to 1) or when an address field has a special value (e.g., 0, 4095 (all bits set to 1), or any other value), an individual WID list may be included in a frame body. Here, since the individual WID list is included in the frame body, the FD length has a value greater than 0.

The individual WID list may include the individual WIDs (I-WIDs) of a plurality of STAs.

For example, a plurality of partial I-WIDs may be included in the individual WID list. A partial I-WID may be N LSBs of an I-WID. N may be an integer greater than 0 and less than 12. Specifically, when the partial I-WID is eight bits, the frame body includes only the individual WID list, and the FD length is four bytes, the individual WID list includes four partial I-WIDs.

According to an embodiment, when frame body length=0 is indicated in a MU wake-up frame, the MU wake-up frame may be defined to indicate all STAs which are allocated a group ID. STAs receiving the MU wake-up frame may turn on PCR (e.g., a WLAN) and may transmit a response frame to an AP through PCR in response to the received MU wake-up frame, thereby notifying the AP that the STAs have woken up.

When the group ID does not have the specific value (e.g., 0 or all bits set to 1) and the frame body (FD) length has a value greater than 0, WID bitmap information may be included in the frame body (or within the WUR frame). The length of the WID bitmap may be determined depending on the FD length. The size of the WID bitmap is the overall FD length excluding the size of optional fields. For example, when the FD length is two bytes and no optional field is included, the size of the WID bitmap is two bytes. When the FD length is four bytes and a two-byte MIC field is included in the frame body, the size of the WID bitmap is two bytes.

The position of a STA within the WID bitmap may be determined based on a WID value and the size of the WID bitmap. For example, when the result of WID modulo WID bitmap size is N, the position of a STA in the WID bitmap may be an N-th bit.

Figure 24:
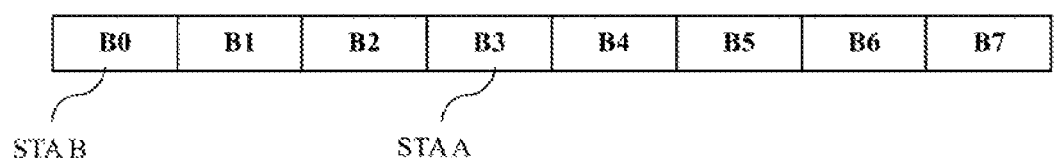
FIG. 24 illustrates the position a STA in a WID bitmap according to an embodiment of the disclosure.

FIG. 24 illustrates the position a STA in a WID bitmap according to an embodiment of the disclosure. In FIG. 24, it is assumed that the WID bitmap has a size of eight bits, and STA A and STA B have a WID of 3 and a WID of 32, respectively. In this case, STA A has a position of Bit 3 as a result of 3 modulo 8, and STA B has a position of Bit 0 as a result of 32 modulo 8.

When a STA belongs to a group indicated by a group ID in a MU WUR frame and a bit corresponding to the position of the STA in the WID bitmap is set to 1, the STA may turn on PCR (e.g., a WLAN) considering that the MU WUR frame is transmitted for the STA. Subsequently, the STA may transmit a response frame to the AP through PCR in response to the MU WUR frame.

When a plurality of STAs shares the same position in the WID bitmap, two or more STAs may wake up at one time (e.g., due to one bit value of 1). This problem may be solved by scheduling by an AP as illustrated below in Examples 1 to 3.

Example 1

The AP may allocate STAs having the same position to different groups. For example, the AP may allocate a STA corresponding to WID=16 to Group 1 and may allocate a STA corresponding to WID=32 to Group 2.

Example 2

The AP may allocate STAs having the same position to different on-durations. For example, Group 1 and On-duration 1 may be allocated to a STA corresponding to WID=8, and Group 1 and On-duration 2 may be allocated to a STA corresponding to WID=16.

Example 3

The AP may configure a WID bitmap only for a STA having a variable WUR frame capability (e.g., a STA capable of receiving a WUR frame having a variable length). Therefore, each bit of the WID bitmap may correspond to each STA having the WUR frame capability. Although a STA not having the variable WUR frame capability (e.g., a STA capable of receiving only a WUR frame having a fixed length) and a STA having the variable WUR frame capability have the same bitmap position, the STA not having the variable WUR frame capability cannot receive a WUR frame having a variable length and thus does not wake up.

Next, a method of allocating a group ID for WUR according to an embodiment of the disclosure is described.

An AP may allocate one or more group IDs to a STA through a WUR negotiation procedure performed through PCR, a WUR-mode signaling procedure, other existing WLAN procedures (e.g., an 11ac group ID allocation procedure), or a new WUR group ID management procedure defined to be similar to an 11ac group ID management procedure.

The AP may allocate a group ID using part of a WUR ID space. In this case, IDs allocated as group IDs are not allocated to a STA as unicast WIDs. For example, a portion of the entire ID range may be used for group IDs, and the remaining range may be used for WIDs. Specifically, assuming that the entire range of IDs is from 0 to 4095 and a range from 1000 to 1500 is used for group IDs, a range from 0 to 999 and a range from 1501 to 4095 are available for WIDs.

In another example of the disclosure, when the AP allocates a group ID to a STA using one of the procedures mentioned above, the AP may additionally provide information indicating whether the group ID is for multicast data reception or for MU wake-up (e.g., MU wake-up for DL MU PPDU transmission in PCR).

Figure 25:
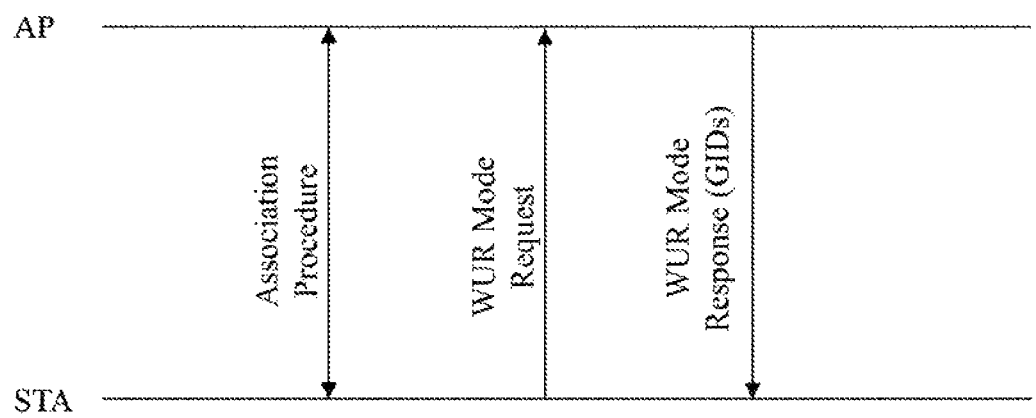
FIG. 25 illustrates a method of allocating a group ID according to an embodiment of the disclosure.

FIG. 25 illustrates a method of allocating a group ID according to an embodiment of the disclosure. Referring to FIG. 25, after establishing an association, a STA transmits a WUR mode request to an AP through PCR. The AP transmits a WUR mode response through PCR, and the WUR mode response may include one or more GIDs to be allocated to the STA.

Figure 26:
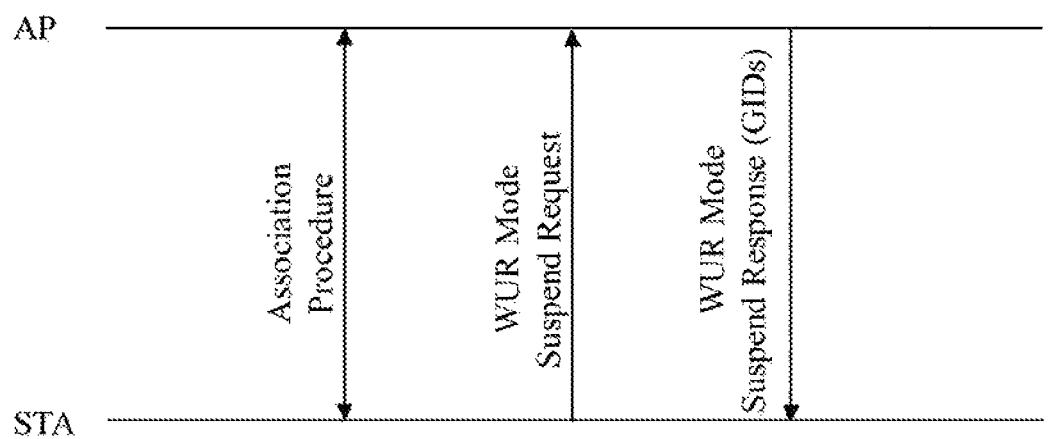
FIG. 26 illustrates a method of allocating a group ID according to another embodiment of the disclosure.

FIG. 26 illustrates a method of allocating a group ID according to another embodiment of the disclosure. Referring to FIG. 26, after establishing an association, a STA transmits a WUR mode suspend request to an AP through PCR. The AP transmits a WUR mode suspend response through PCR, and the WUR mode suspend response may include one or more GIDs to be allocated to the STA.

Figure 27:
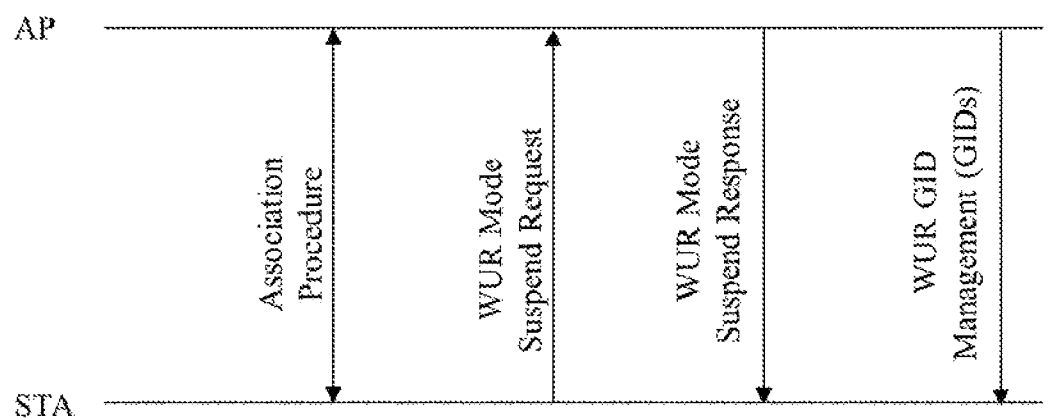
FIG. 27 illustrates a method of allocating a group ID according to still another embodiment of the disclosure.

FIG. 27 illustrates a method of allocating a group ID according to still another embodiment of the disclosure. Referring to FIG. 27, after establishing an association, a STA transmits a WUR mode suspend request to an AP through PCR. The AP transmits a WUR mode suspend response through PCR. Subsequently, the AP transmits a WUR GID management frame, and the WUR GID management frame may include one or more GIDs to be allocated to the STA.

In the examples illustrated in FIG. 25 to FIG. 27, when the AP allocate each group ID, the AP may also transmit information indicating whether each group ID is for receiving multicast data (or multicast group-addressed frame) or for multi-user wake-up (e.g., for DL MU PPDU transmission in PCR).

For example, a specific group ID among allocated group IDs may be used for multicast data (e.g., may be mapped to a specific multicast address) or a multicast group-addressed frame. When the STA receives a wake-up frame and a group ID included in the wake-up frame matches a group ID indicating multicast data among group IDs allocated to the STA, the STA may wake up (i.e., turn on PCR) and may wait to receive a multicast group-addressed frame/group-addressed frame instead of transmitting a response frame (e.g., PS-poll, QoS null, or other frames) to the AP by PCR.

Another specific group ID may be used to indicate multi-user wake-up (or DL MU PPDU transmission in PCR). Generally, when the AP has unicast data to be transmitted to STAs in a group, the AP may wake up a STA by transmitting a wake-up frame including a group ID used to indicate multi-user wake-up (or DL MU PPDU transmission in PCR). When the STA receives a wake-up frame and a group ID included in the wake-up frame matches a group ID indicating multi-user wake-up (or DL MU PPDU transmission in PCR) among group IDs allocated to the STA, the STA may wake up (i.e., turn on PCR) and may transmit a WUR response frame (e.g., PS-poll, QoS null, or other frames) to the AP by PCR.

Further, when the group ID indicating multi-user wake-up (or DL MU PPDU transmission in PCR) is included in the wake-up frame, the AP may additionally include one of a STA's position bitmap, a WID bitmap, and a WID list (e.g., a list including multiple unicast WIDs), which are mentioned above, in the wake-up frame (e.g., in a frame body or in a TD control field) for transmission. Since only STAs indicated by the bitmap or the WID list among the STAs belonging to the group wake up, false wake-up may be reduced. To this end, an additional field (e.g., a bitmap/WID list indication field) may be included in a MAC header. Here, an FD length has a value greater than 0. Also, as mentioned above, when either a group WID or a WID has a specific value, an individual WID list may be included in the frame body.

To indicate whether the WID list is included, a specific WID value may be used.

In the above example, FD length information is described assuming that when a multicast wake-up frame has a variable-length frame body, only one of a WID list, a STA position bitmap, and an individual WID bitmap is included in the frame body. However, when the frame body includes information other than information about a plurality of STAs, an FD length may be calculated to have a size including the additional information.

Figure 28:
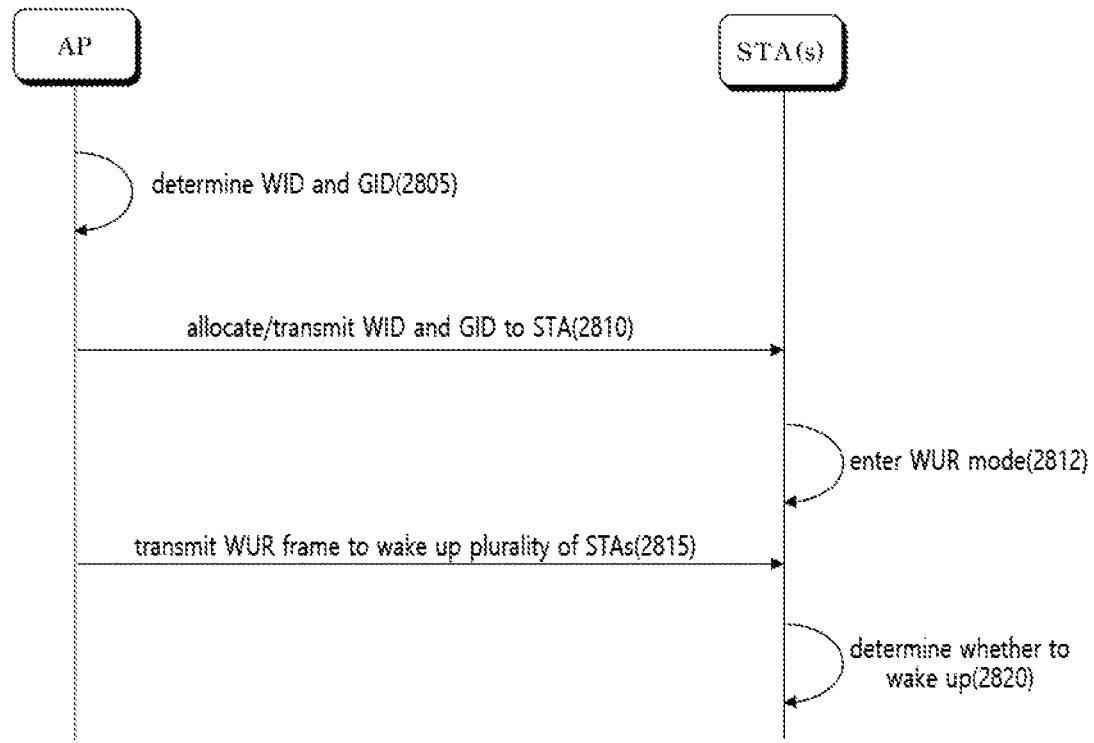
FIG. 28 illustrates the flow of a frame transmission/reception method according to an embodiment of the disclosure.

FIG. 28 illustrates the flow of a frame transmission/reception method according to an embodiment of the disclosure.

Referring to FIG. 28, an AP determines a WUR identifier (WID) for identifying a STA in a wake-up radio (WUR) mode and a group identifier (GID) for identifying a STA group to which the STA belongs (2805). The AP may determine the GID using a portion of an ID space available for WUR and may determine the WID using a portion other than the portion of the ID space used for the GID.

The AP transmits the WID and the GID through a primary connectivity radio (PCR) in order to allocate the WID and the GID to the STA (2810). The WID and GID may be transmitted through one PCR frame or may be transmitted through different PCR frames, respectively. For example, the AP may transmit one or more GIDs including the GID to the STA through a WUR mode response frame or a WUR mode suspend response frame. The WUR mode response frame may be a response frame to a WUR mode request frame transmitted by the STA. The WUR mode suspend response frame may be a response frame to a WUR mode suspend request frame transmitted by an STA.

The STA may enter the WUR mode (2812). In the WUR mode, a PCR transceiver of the STA may operate in a sleep state (e.g., a doze state).

The AP may transmit a WUR frame for waking a plurality of STAs including the STA operating in the WUR mode based on the GID or the WID (2815).

For example, when the AP intends to transmit the WUR frame based on the GID, the AP may set the GID in an address field of the WUR frame. In another example, when the AP intends to transmit the WUR frame based on the WID, the AP may set 0 other than the GID or the WID in the address field of the WUR frame and may set the WIDs of the plurality of STAs in a frame body of the WUR frame.

The STA may determine whether to wake up based on whether the WUR frame includes the GID or WID allocated to the STA (2820).

For example, when the address field of the WUR frame includes the GID allocated to the STA, the STA may wake up and may transmit a response frame to the WUR frame through PCR. When receiving the response frame from the STA through PCR after transmitting the WUR frame based on the GID, the AP may determine that the STA has woken up.

In another example, when the address field of the WUR frame has 0 other than the GID or WID allocated to the STA, the STA may attempt to detect the WID of the STA in the frame body assuming that the frame body of the WUR frame includes the WIDs of a plurality of STAs. When the WID of the STA is detected in the frame body, the STA may determine to wake up.

When the WUR frame includes the GID, the WUR frame may further include a bitmap indicating a STA to be woken up in the group identified by the GID as a bit value of 1. The AP/STA may determine a bit position corresponding to the STA in the bitmap through a modulo operation between the WID of the STA and the size of the bitmap. When a STA different from the STA is equally allocated the GID and the STA and the different STA have the same bit position in the bitmap, the AP may set different WUR duty cycle on-durations for the STA and the different STA.

Figure 29:
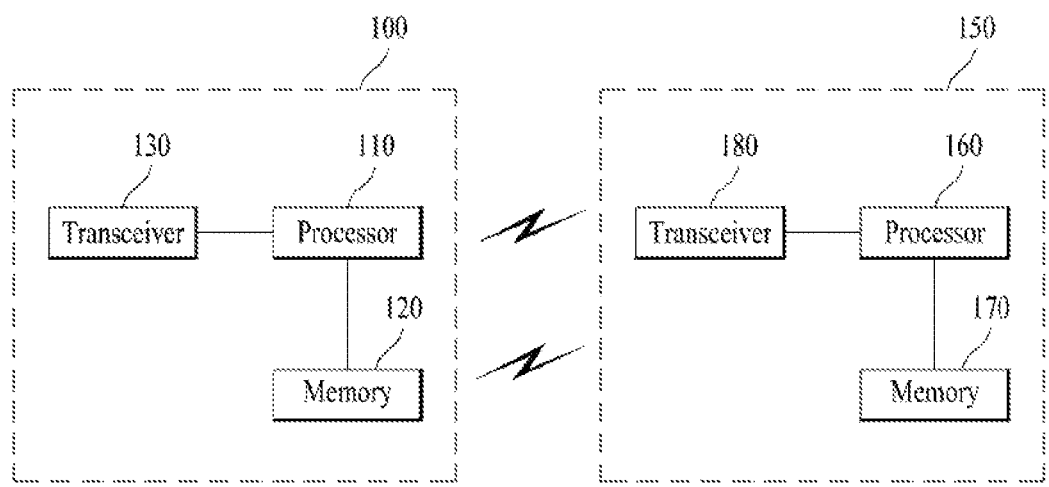
FIG. 29 illustrates a device according to an embodiment of the disclosure.

FIG. 29 illustrates a device for implementing the foregoing method.

In FIG. 29, a wireless device 100 may correspond to a specific STA described above, and a wireless device 150 may correspond to an AP described above.

The STA 100 may include a processor 110, a memory 120, and a transceiver 130, and the AP 150 may include a processor 160, a memory 170, and a transceiver 180. The transceivers 130 and 180 transmit/receive a radio signal and may operate in a physical layer of IEEE 802.11/3GPP or the like. The processors 110 and 160 may operate in the physical layer and/or MAC layer and may be connected to the transceivers 130 and 180.

The processors 110 and 160 and/or the transceivers 130 and 180 may include an application-specific integrated circuit (ASIC), a separate chipset, a logic circuit, and/or a data processor. The memories 120 and 170 may include a read-only memory (ROM), a random access memory (RAM), a flash memory, a memory card, a storage medium, and/or a separate storage unit. When one embodiment is executed by software, the foregoing methods may be implemented with a module (e.g., a processes or a functions) for performing the foregoing functions. The modules may be stored in the memories 120 and 170 and may be executed by the processors 110 and 160. The memories 120 and 170 may be disposed inside or outside the processors 110 and 160 and may be connected to the processors 110 and 160 via a well-known means.

The transceiver 130 of the STA may include a transmitter (not shown) and a receiver (not shown). The receiver of the STA may include a main connectivity radio (e.g., a WLAN such as IEEE 802.11 a/b/g/n/ac/ax) receiver to receive a main connectivity radio signal and a WUR receiver to receive a WUR signal. The transmitter of the STA may include a main connectivity radio transmitter to transmit a main connectivity radio signal.

The transceiver 180 of the AP may include a transmitter (not shown) and a receiver (not shown). The transmitter of the AP may correspond to an OFDM transmitter. The AP may transmit a WUR payload by OOK reusing the OFDM transmitter. For example, as described above, the AP may modulate the WUR payload using OOK via an OFDM transmitter.

As described above, the detailed description of the exemplary embodiments of the disclosure are provided so that those skilled in the art can implement and execute the disclosure. Although the disclosure has been described above with reference to the exemplary embodiments of the disclosure, it will be understood by those skilled in the art that diverse modifications, alterations, and variations can be made in the disclosure. Therefore, the scope and spirit of the disclosure will not be limited only to the exemplary embodiments of the disclosure set forth herein. Thus, it is intended to provide the broadest scope and spirit of the appended claims of the disclosure that are equivalent to the disclosed principles and novel characteristics of the disclosure.

INDUSTRIAL APPLICABILITY

The disclosure is applicable to various wireless communication systems including IEEE 802.11.

What is claimed is:

1. A method for an access point (AP) to transmit a frame in a wireless local area network (WLAN), the method comprising:
    receiving a wake-up radio (WUR) mode request frame from a station (STA) through a primary connectivity radio (PCR);
    determining (i) a WUR identifier (WID) for identifying the STA in a WUR mode and (ii) a group identifier (GID) for identifying a STA group to which the STA belongs;
    transmitting, through the PCR, a WUR mode response frame including the WID and the GID; and
    transmitting a WUR frame for waking up a plurality of STAs comprising the STA operating in the WUR mode based on the GID or the WID,
    wherein the GID is allocated using a portion of an ID space available for WUR, and the WID is allocated using a portion other than the portion of the ID space used for the GID, and
    wherein an entire range of the ID space is from 0 to 4095.

2. The method of claim 1, further comprising:
    determining that the STA has woken up when receiving a response frame from the STA after transmitting the WUR frame.

3. The method of claim 1, wherein a frame body of the WUR frame which is transmitted based on the GID includes a WID list of the plurality of STAs.

4. The method of claim 1, wherein the AP transmits one or more GIDs comprising the GID to the STA through the WUR mode response frame or a WUR mode suspend response frame.

5. The method of claim 1, wherein when the WUR frame comprises the GID, the WUR frame further comprises a bitmap indicating a STA to be woken up in the group identified by the GID as a bit value of 1, and
    the AP determines a bit position corresponding to the STA in the bitmap through a modulo operation between the WID of the STA and a size of the bitmap.

6. The method of claim 5, wherein when the STA and another STA are allocated to the same GID and bit positions for the STA and the other STA in the bitmap are equally set, the AP sets different WUR duty cycle on-durations for the STA and the other STA.

7. A method for a station (STA) to receive a frame in a wireless local area network (WLAN), the method comprising:
    transmitting a wake-up radio (WUR) mode request frame through a primary connectivity radio (PCR);
    receiving, through the PCR, a WUR mode response frame including (i) a WUR identifier (WID) for identifying the STA in a WUR mode and (ii) a group identifier (GID) for identifying a STA group to which the STA belongs;
    receiving a WUR frame for waking up a plurality of STAs; and
    determining whether to wake up based on whether the WUR frame comprises the GID or the WID,
    wherein the GID is allocated using a portion of an ID space available for WUR, and the WID is allocated using a portion other than the portion of the ID space used for the GID, and
    wherein an entire range of the ID space is from 0 to 4095.

8. The method of claim 7, further comprising:
    transmitting a response frame in response to the WUR frame.

9. The method of claim 7, wherein a frame body of the WUR frame which is transmitted based on the GID includes WID list of the plurality of STAs.

10. The method of claim 7, wherein the STA receives one or more GIDs comprising the GID through the WUR mode response frame or a WUR mode suspend response frame.

11. The method of claim 7, wherein when the WUR frame comprises the GID, the WUR frame further comprises a bitmap indicating a STA to be woken up in the group identified by the GID as a bit value of 1, and
    the STA determines a bit position corresponding to the STA in the bitmap through a modulo operation between the WID of the STA and a size of the bitmap.

12. The method of claim 11, wherein when the STA and another STA are allocated to the same GID and bit positions for the STA and the other STA in the bitmap are equally set, different WUR duty cycle on-durations are set for the STA and the another STA.

13. An access point (AP) configured to operate in a wireless local area network (WLAN), the AP comprising:
    a transceiver; and
    a processor configured to:
    receive a wake-up radio (WUR) mode request frame from a station (STA) through a primary connectivity radio (PCR),
    determine (i) a WUR identifier (WID) for identifying the STA in a WUR mode and (ii) a group identifier (GID) for identifying a STA group to which the STA belongs,
    transmit a WUR mode response frame including the WID and the GID through the PCR, and
    transmit a WUR frame for waking up a plurality of STAs comprising the STA operating in the WUR mode based on the GID or the WID,
    wherein the GID is allocated using a portion of an ID space available for WUR, and the WID is allocated using a portion other than the portion of the ID space used for the GID, and
    wherein an entire range of the ID space is from 0 to 4095.

14. A station (STA) configured to operate in a wireless local area network (WLAN), the STA comprising:
    a primary connectivity radio (PCR) transceiver;
    a wake-up radio (WUR) receiver; and
    a processor configured to:
    transmit a WUR mode request frame through the PCR transceiver,
    receive, through the PCR transceiver, a WUR mode response frame including (i) a WUR identifier (WID) for identifying the STA in a WUR mode and (ii) a group identifier (GID) for identifying a STA group to which the STA belongs,
    receive a WUR frame for waking up a plurality of STAs through the WUR receiver, and
    determine whether to wake up based on whether the WUR frame comprises the GID or the WID,
    wherein the GID is allocated using a portion of an ID space available for WUR, the WID is allocated using a portion other than the portion of the ID space used for the GID, and
    wherein an entire range of the ID space is from 0 to 4095.

* * * * *